US008307330B2

(12) United States Patent
Kumar et al.

(10) Patent No.: US 8,307,330 B2
(45) Date of Patent: Nov. 6, 2012

(54) TYPE GENERIC GRAPHICAL PROGRAMMING

(75) Inventors: Satish V. Kumar, Austin, TX (US); Duncan G. Hudson, III, Austin, TX (US); Jeffrey L. Kodosky, Austin, TX (US); Steven W. Rogers, Austin, TX (US); Newton G. Petersen, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1479 days.

(21) Appl. No.: 11/838,387

(22) Filed: Aug. 14, 2007

(65) Prior Publication Data

US 2009/0049424 A1      Feb. 19, 2009

Related U.S. Application Data

(60) Provisional application No. 60/893,145, filed on Mar. 6, 2007.

(51) Int. Cl.
*G06F 9/44* (2006.01)
(52) U.S. Cl. ........................................................ 717/109
(58) Field of Classification Search .................. 717/109
See application file for complete search history.

(56) References Cited

U.S. PATENT DOCUMENTS

| 5,734,863 | A | | 3/1998 | Kodosky et al. | |
|---|---|---|---|---|---|
| 5,905,649 | A | | 5/1999 | Sojoodi et al. | |
| 5,966,532 | A | * | 10/1999 | McDonald et al. | 717/105 |
| 6,053,951 | A | * | 4/2000 | McDonald et al. | 717/109 |
| 6,526,566 | B1 | * | 2/2003 | Austin | 717/109 |
| 6,690,981 | B1 | * | 2/2004 | Kawachi et al. | 717/109 |
| 6,976,222 | B2 | * | 12/2005 | Sojoodi et al. | 717/105 |
| 7,024,631 | B1 | | 4/2006 | Hudson et al. | |
| 7,216,334 | B2 | | 5/2007 | Kodosky et al. | |
| 7,308,672 | B2 | | 12/2007 | Waters et al. | |
| 7,627,860 | B2 | * | 12/2009 | Kodosky et al. | 717/141 |
| 7,836,426 | B2 | * | 11/2010 | Peck et al. | 717/109 |
| 2005/0039176 | A1 | * | 2/2005 | Fournie | 717/156 |
| 2005/0155014 | A1 | * | 7/2005 | Andrade et al. | 717/105 |
| 2006/0036799 | A1 | * | 2/2006 | Shah et al. | 717/109 |
| 2006/0117302 | A1 | * | 6/2006 | Mercer et al. | 717/131 |
| 2006/0130025 | A1 | * | 6/2006 | Walpole | 717/141 |

OTHER PUBLICATIONS

Dos Reis, et al., "What is Generic Programming?", Library-Centric Software Design Workshop, Texas A&M University, retrieved from Internet: http://lcsd05.cs.tamu.edu/papers/dos_reis_et_al.pdf, Oct. 2005, 11 pages.

\* cited by examiner

*Primary Examiner* — Ted T. Vo
*Assistant Examiner* — Junchun Wu
(74) *Attorney, Agent, or Firm* — Meyertons Hood Kivlin Kowert & Goetzel, P.C.; Jeffrey C. Hood; Joel L. Stevens

(57) ABSTRACT

A system and method for creating and using type generic graphical programs. The method may include storing a first graphical program on a memory medium. The first graphical program may have been created based on user input. The first graphical program may include a plurality of nodes and interconnections between the nodes, and the plurality of nodes and interconnections between the nodes may be type generic. User input may be received specifying one or more data types of at least one input and/or at least one output of the first graphical program. The data types may be associated with the first graphical program in response to said user input specifying the one or more data types.

32 Claims, 20 Drawing Sheets

Computer System
82

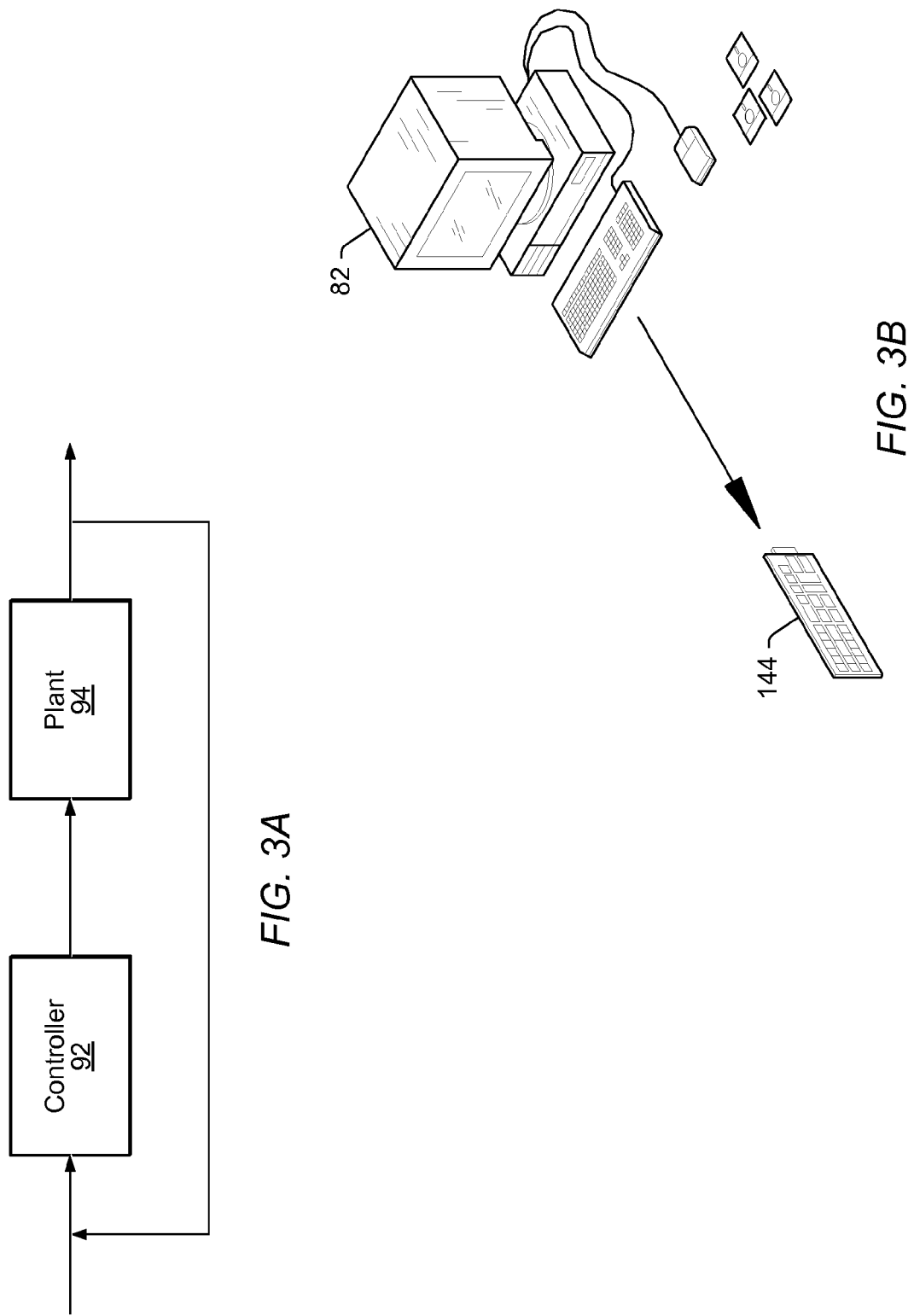

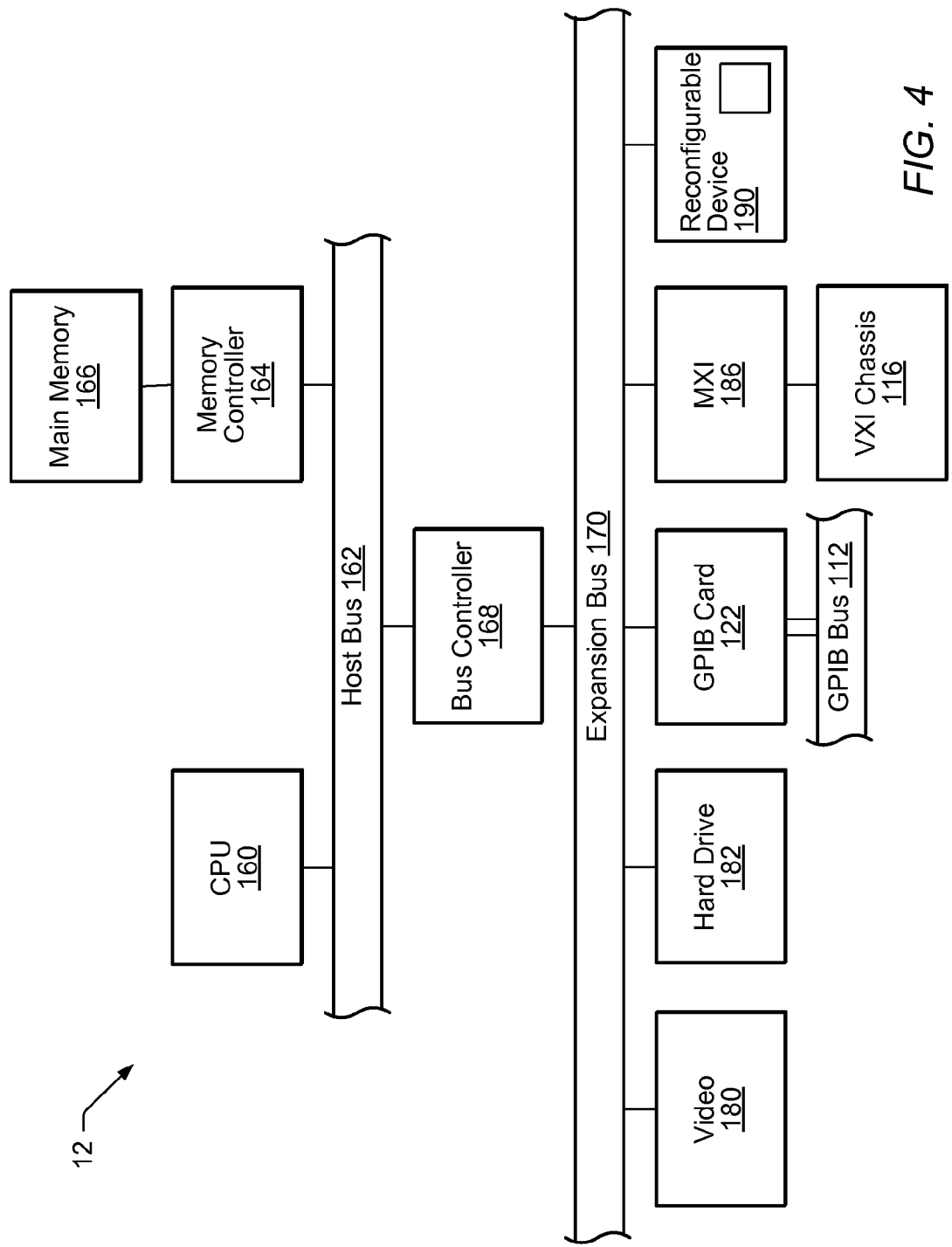

TYPE GENERIC GRAPHICAL PROGRAMMING

PRIORITY INFORMATION

This application claims benefit of priority of U.S. provisional application Ser. No. 60/893,145, titled "Type-Generic Graphical Programming", filed Mar. 6, 2007, whose inventors are Satish V. Kumar, Duncan G. Hudson III, Jeffrey L. Kodosky, and Steven W. Rogers.

FIELD OF THE INVENTION

The present invention relates to the field of graphical programming, and more particularly to a system and method for creating and using data type generic data structures in a graphical program.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Graphical programming allows for the creation of graphical programs, also referred to as virtual instruments (VIs), which may implement user specified functionality. Oftentimes, users may want to use the same VI in situations for which the VI was not originally created. For example, it may be desirable to use a VI, which was initially created for manipulating integers, for manipulating strings in a similar fashion.

Using conventional graphical programming methods, users had a few options. For example, for a simple case, the user would have to recreate another VI, e.g., by copying the original VI and changing the data types for the new VI. Alternatively, the user may create a polymorphic VI. Polymorphic VIs require that the user specify several graphical programs for the polymorphic VI, each associated with a different data type. Correspondingly, during instantiation, one of these graphical programs would be selected based on the data types of the inputs to the polymorphic VI. Thus, using a polymorphic VI, the user would be required to program a graphical program for each different data type. As another option, a user could use an "xnode". More specifically, using xnodes, users could write graphical scripting code, which, in response to receiving a data type, would automatically generate a graphical program according to the graphical scripting code. Further descriptions regarding polymorphic VIs and xnodes can be found in U.S. Pat. Nos. 7,024,631 and 7,216,334.

In previous text-based programming languages, functions could be written type generically using "type generics" and "templates". Thus, previous text-based methods did not apply to graphical programs (due to the nature of graphical programming) and previous graphical programming techniques required specification of coding for automatic graphical program creation, modification of existing graphical programs, or specification of multiple graphical programs in a polymorphic VI. These methods did not allow for the creation of a type generic graphical program which could be instantiated for multiple data types without specification of a graphical program for each different data type (as with polymorphic VIs) and without specification of scripting code for each different data type (as with xnodes). Thus, data-type generic graphical programming would be desirable.

SUMMARY OF THE INVENTION

Various embodiments of a system and method for creating and using a data type generic graphical program are presented.

In one embodiment, a graphical program may be created in response to user input. The graphical program may include a plurality of nodes and interconnections between the nodes. These interconnected nodes may visually indicate functionality of the graphical program. In some embodiments, the graphical program may comprise an executable block diagram, such as a data flow diagram. The graphical program may include a block diagram portion and a user interface portion. In some embodiments, the graphical program may be a sub-graphical program inside of another graphical program or may itself include other graphical programs, e.g., as sub-graphical programs or sub-VIs. The graphical program may include one or more inputs and one or more outputs. Some or all of these inputs and outputs may have respective types, e.g., as specified by the user.

In one embodiment, the graphical program may be originally created as a type generic graphical program in response to user input. Note that the type generic graphical program may include one or more nodes (or node inputs/outputs; or wires) that have associated data types and one or more nodes that are type generic. However, in one embodiment, all of the nodes in the type generic graphical program are type generic. In another embodiment, the graphical program may be first created as a type-specific graphical program and then may be converted to a type generic graphical program, e.g., in response to user input. As noted above, the converted type generic graphical program may include any combination of at least one type generic input or output and at least one statically typed input or output.

The type generic graphical program is executable to perform the functionality for a plurality of different types, e.g., for a plurality of different data types. Also, the type generic graphical program comprises one set of graphical code that performs the functionality for the plurality of different types. In other words, the user is not required to create different sets of graphical code for each of the different possible types (as with polymorphic graphical programs). Also, the one set of graphical code performs the functionality for the plurality of different types, as opposed to prior art x nodes which have code that generates other code to perform desired functionality.

One or more data types may be specified, e.g., by the user, for at least one input and/or output of the type generic program. In some embodiments, receiving user input specifying the one or more data types may include receiving user input connecting inputs or outputs of the type generic graphical program to one or more nodes in a second graphical program. Alternatively, or additionally, the user may specify the one or more data types by providing input to a menu, dialog box, or other GUI element in a graphical user interface (GUI) associated with the graphical program. In one embodiment, the user may specify the one or more data types by providing user input to input controls associated with the graphical program (e.g., one or more inputs of the graphical program). Alternatively, the user may specify the one or more data types by providing user input to output controls associated with the graphical program (e.g., outputs of the graphical program).

The specified data types may be associated with the graphical program in response to the user input. Associating the specified one or more data types with the type generic graphical program may be performed automatically in response to the user specification of the one or more data types. For example, the graphical programming environment may propagate the specified one or more data types to inputs and/or outputs of a subset or all of the nodes in the graphical program. Type propagation may occur at edit time, compile time, load time, and/or at any other time. In one embodiment, type propagation may typically be performed at edit time, e.g., at the end of each user edit transaction. Alternatively, or additionally, type propagation may occur when you load or save the graphical program, and/or load or save other graphical programs associated with the graphical program.

Propagation of the data types may include propagation of data types to immediate neighbors (e.g., the nearest connected nodes or wires to a node or wire with a specified data type), back propagation (in the opposite direction of data flow), propagation of attributes of the data types, and/or other propagation methods. In some embodiment, propagating the data types may include assigning data types with some or all of the nodes, inputs, outputs, wires, etc. which are coupled to an element with a specified type.

As a more specific example, the user may instantiate the type generic graphical program as a VI in another graphical program and connect one or more inputs or outputs of the VI with nodes in the graphical program. In response, the graphical programming environment may propagate the data types associated with the nodes in the graphical program to the VI. More specifically, upon associated one or more data types with the inputs or outputs in the VI, any type generic nodes in the VI may be assigned to corresponding data types, e.g., propagated from the inputs or outputs.

In some embodiments, one or more nodes (or inputs/outputs of the nodes) may be type-linked, e.g., by a type variable. Correspondingly, when a data type is associated with a first node in the one or more nodes, the data type (or a specified data type relationship) may be associated with one or more other nodes that are linked to the first node.

Furthermore, in one embodiment, the method may further comprise automatically selecting functionality or an implementation of the graphical program based on the specified one or more data types and automatically modifying the first graphical program based on the selected functionality or implementation.

As indicated above, the graphical program may include a GUI for interacting or viewing results during execution of the graphical program. Similar to above, the GUI may be specified for a type generic graphical program. As indicated, the user may specify data types for the GUI in order to specify data types for the associated block diagram. For example, each input control and output indicator may be associated with various nodes in the graphical program, and upon specifying data types with the elements of the GUI these data types may be associated with the respective nodes in the graphical program. Alternatively, similar to descriptions above, the GUI may be associated with a typed graphical program and it may be converted to a type generic GUI until data types are associated with the GUI. Thus, the GUI of the graphical program may also be used in type generic graphical programming.

Thus, a type generic graphical program may be instantiated as or converted to a graphical program with associated data types, allowing for the use of type generics in graphical programming.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize graphical programs;

FIG. 3B illustrates an exemplary system which may perform control and/or simulation functions utilizing graphical programs;

FIG. 4 is an exemplary block diagram of the computer systems of FIGS. 1A, 1B, 2A and 2B and 3B;

Figure 1A:
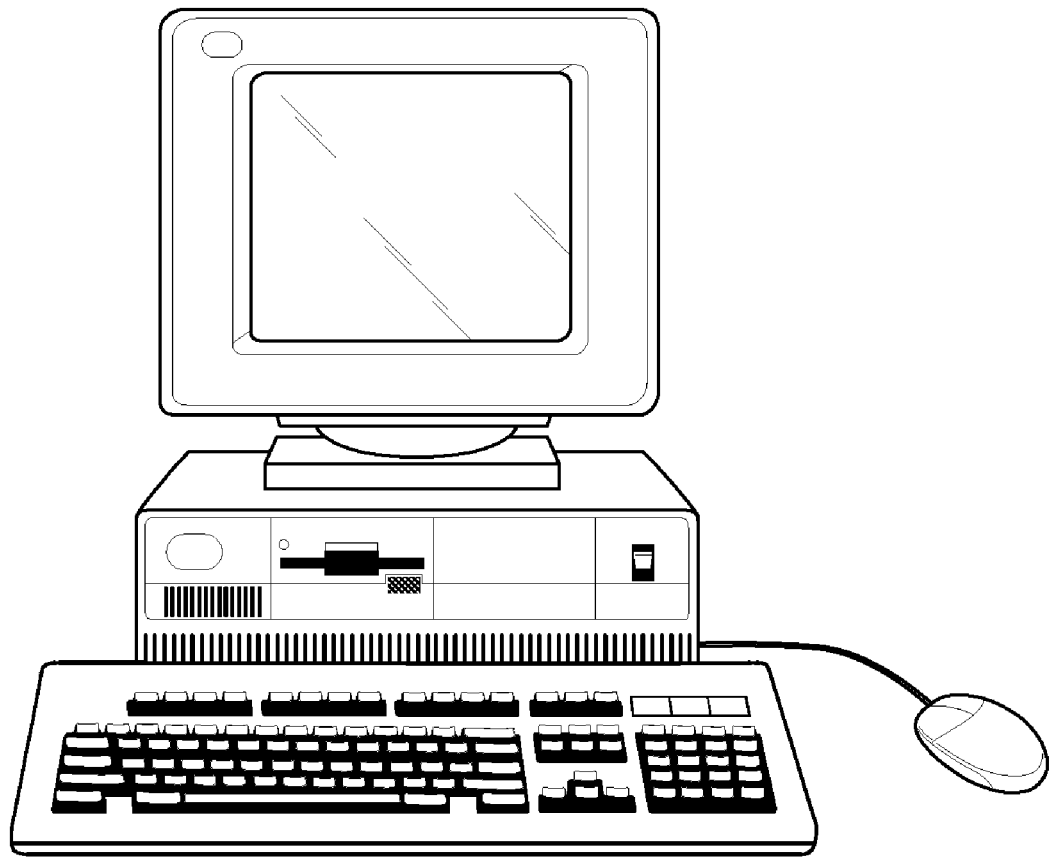
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 (Publication No. 20010020291) (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Node—In the context of a graphical program, an element that may be included in a graphical program. A node may have an associated icon that represents the node in the graphical program, as well as underlying code and/or data that implements functionality of the node. Exemplary nodes include function nodes, sub-program nodes, terminal nodes, structure nodes, etc. Nodes may be connected together in a graphical program by connection icons or wires. The nodes in a graphical program may also be referred to as graphical program blocks or simply blocks.

Graphical Data Flow Program (or Graphical Data Flow Diagram)—A graphical program or diagram comprising a plurality of interconnected nodes, wherein at least a subset of the connections among the blocks visually indicate that data produced by one block is used by another nodes. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Type Specific—an entity having specific data type(s). Specific data types include numeric types (e.g., doubles, floats, or integers (e.g., of specific bit widths)), textual types (e.g., strings or paths), Boolean types, and/or other specific types.

Type generic Type—this term refers to a data type that is a placeholder for a specific type. A type generic type may be completely type generic or may be type generic to a class of data types. For example, a type generic type may be type generic for a class of data types such as numeric types or textual types.

Type generic—an entity having a type generic data type or an entity which includes one or more type generic elements. For example, a graphical program may be type generic when one or more nodes and/or wires in the graphical program do not have an associated type. Thus, the graphical program may be type generic when a subset or all of the nodes and/or wires of the graphical program are type generic as to type. In other words, a graphical program may be type generic even when some of the nodes or wires are type specific. Additionally, the entity, e.g., the graphical program, may be type generic in relation to a class of type generic data types. For example, the graphical program may be a numeric type generic graphical program (and may still be referred to as a type generic graphical program), meaning that the graphical program may be type generic as to type with respect to numeric data types, but not other data types. The terms "data type generic" or "type generic" are used herein to refer to "type generic".

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 usable for creating and using a data-type generic graphical program. Various embodiments of a method for creating and using a data-type generic graphical program are presented below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
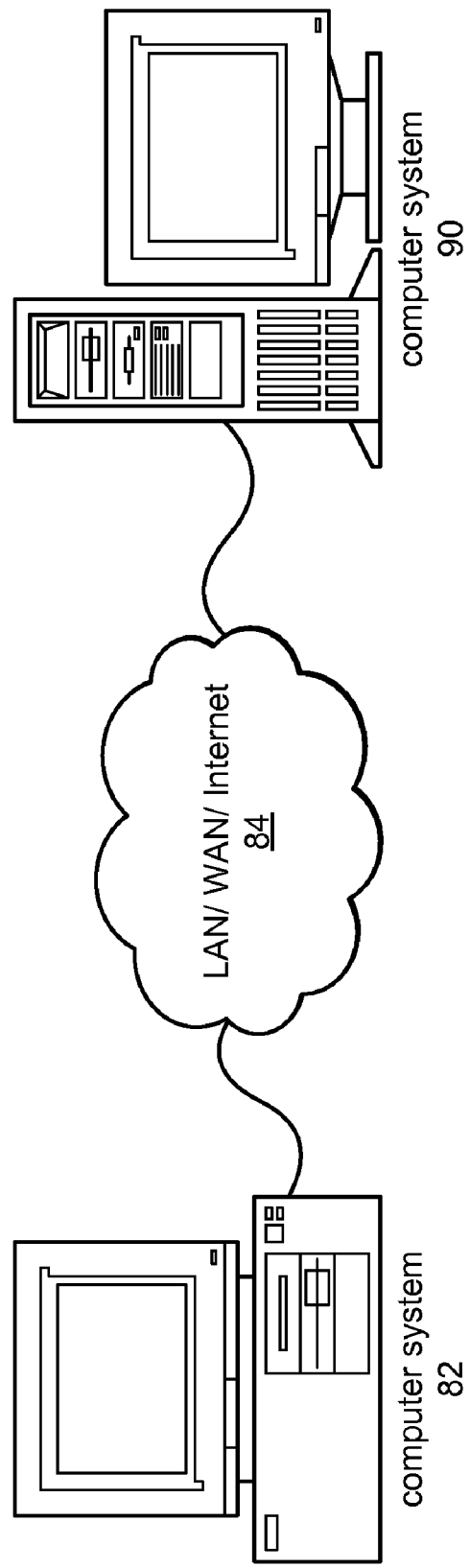
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

One or more of the computer systems 82 and 90 may store and/or execute a graphical program development system that is used for creating and/or executing type generic graphical programs as described herein. Note that executing a type generic graphical program may comprise first converting the type generic graphical program to a type specific graphical program and then executing the type specific graphical program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
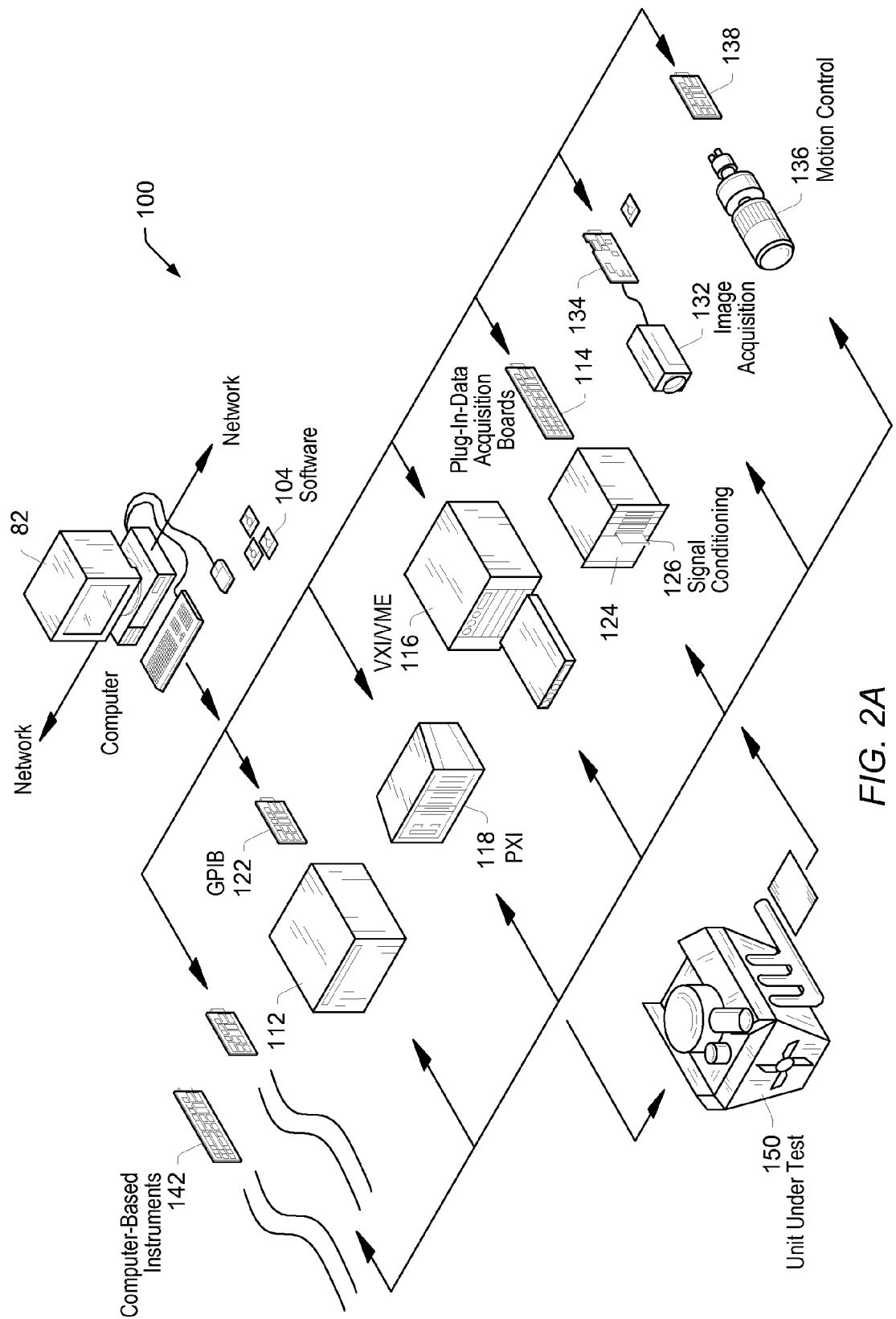
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
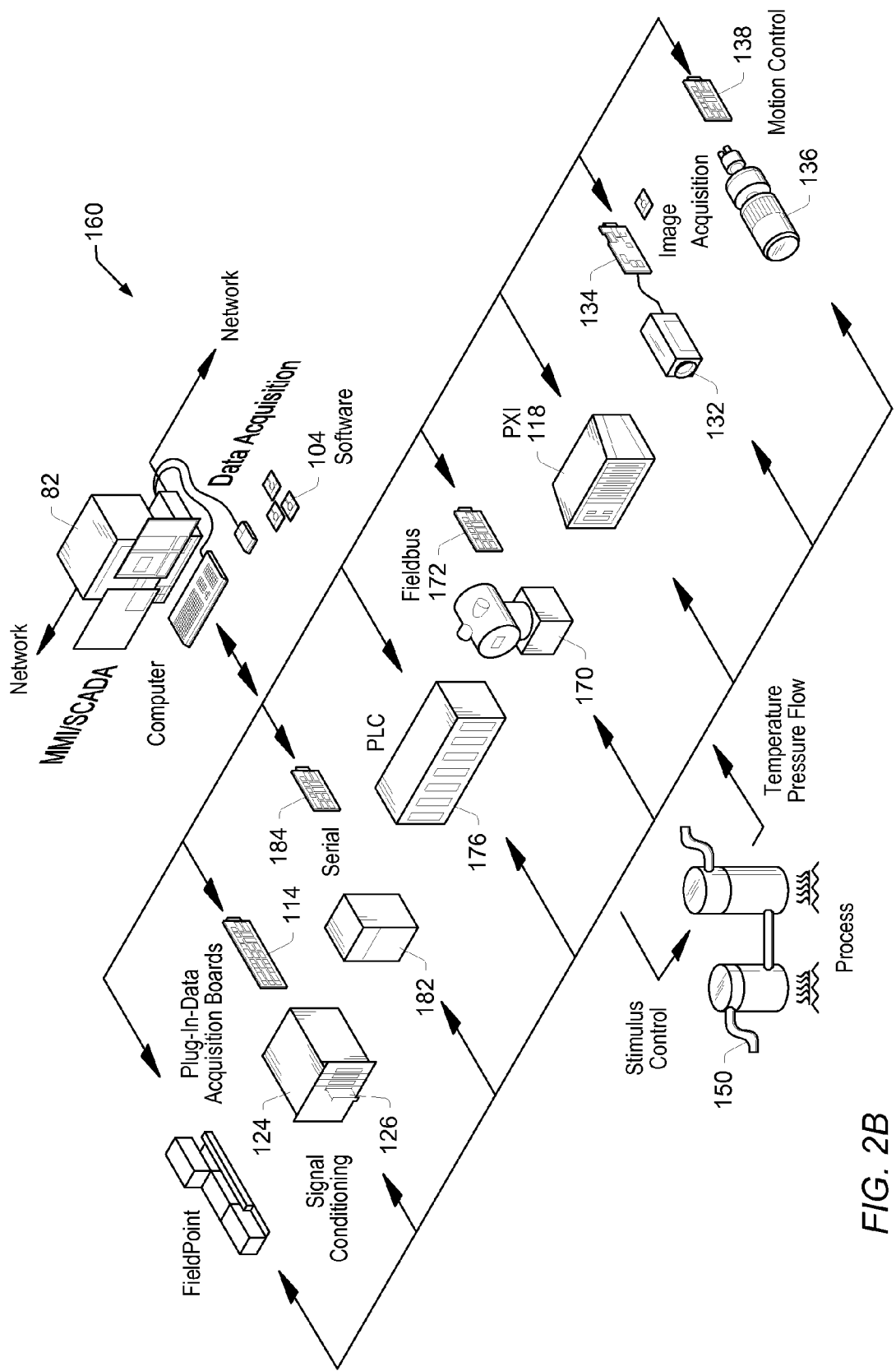
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

One or more of the devices in FIGS. 2A and/or 2B may comprise a programmable hardware element. As described herein, an instantiation of a type generic graphical program may be implemented on a programmable hardware element of one of the devices of FIGS. 2A and/or 2B.

FIG. 3A is a high level block diagram of an exemplary system which may execute or utilize type generic graphical programs as described herein. FIG. 3A illustrates a general high-level block diagram of a type generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment, one or more type generic graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment, one or more type generic graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

The use of type generic graphical programs in RCP and/or HIL simulation may allow a single graphical program to be used in simulating various different devices which require different data types.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store various graphical programs, e.g., type generic and/or type-specific graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
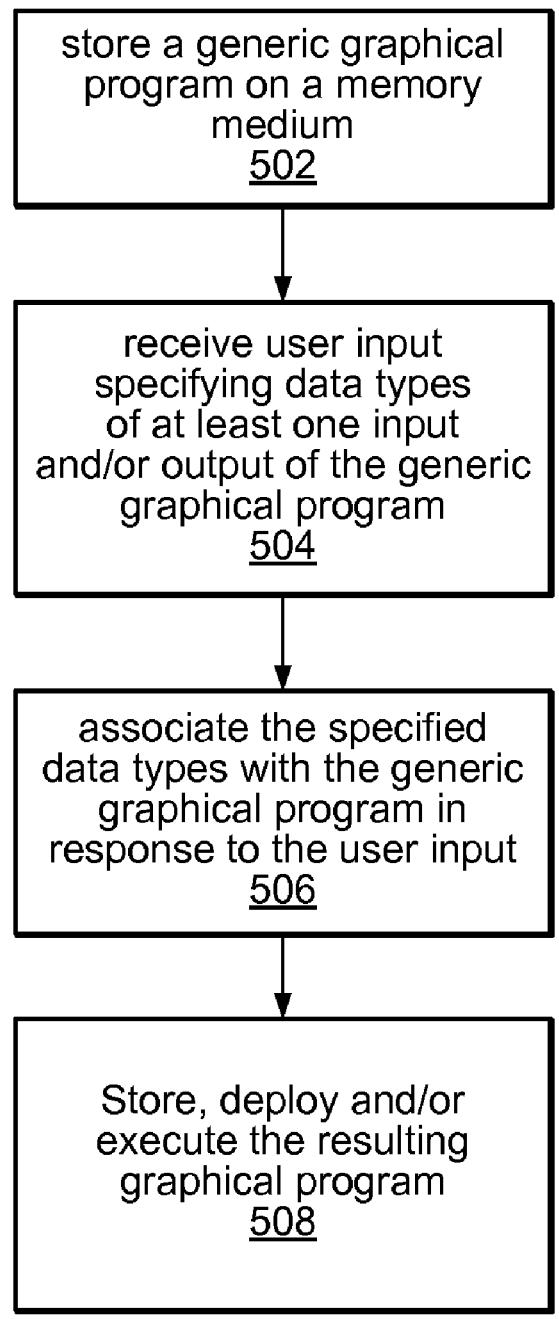
FIG. 5 is a flowchart diagram illustrating one embodiment of a method for creating a type generic graphical program and associating data types with the graphical program.

FIG. 5—Associating Data Types with a Type Generic Graphical Program

FIG. 5 illustrates a method for creating/storing a type generic graphical program and associating data types with the type generic graphical program. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a type generic graphical program may be stored on a memory medium. As used herein "data type generic", "type generic", or "type generic" graphical programs refers to "type generic" graphical programs as mentioned above, i.e., graphical programs which include one or more nodes or wires that are type generic. Thus, in some embodiments, a type generic graphical program may comprise a plurality of type generic nodes and wires (i.e., connections between the nodes). However, in some embodiments, a type generic graphical program may include one or more nodes or wires which do have associated data types. Note that in these embodiments, the type generic graphical program will still include at least one node or wire that is type generic.

The type generic graphical program is executable to perform the functionality for a plurality of different types, e.g., for a plurality of different data types. Also, the type generic graphical program comprises one set of graphical code that performs the functionality for the plurality of different types. In other words, the user is not required to create different sets of graphical code for each of the different possible types (as with polymorphic graphical programs). Also, the one set of graphical code performs the functionality for the plurality of different types, e.g., as opposed to prior art x nodes which requires the user to write code that generates other code to perform desired functionality. Thus the user is not required to create different subprogram code for each different possible type. Further, the type generic graphical program is useable for any data type of the respective data type class for which it has been created. This differs from polymorphic VIs, which are only useable for data types for which the user has previously created a specific program for that type.

Additionally, the type generic graphical program may be a specified class of type generic graphical program, e.g., a numeric type generic graphical program, a textual type generic graphical program, etc. Alternatively, the graphical program may be a type generic graphical program that can only be instantiated with specific types, e.g., as specified by user input. For example, the type generic graphical program may be limited to a numeric type generic graphical program. In this case, the numeric type generic graphical program may only accept numeric types and may not accept other data types such as strings, Booleans, etc. As another example, the user may simply specify the data types that may be associated with the type generic graphical program such that the type generic graphical program is not "completely" type generic, but is type generic to the specified data types. Furthermore, the type generic graphical program may have default types, e.g., specified by the user.

In some embodiments, the type generic graphical program may be stored in response to user input assembling or creating the type generic graphical program. For example, the type generic graphical program may be created or assembled by the user arranging on a display a plurality of nodes or icons and then interconnecting the nodes to create the type generic graphical program. In response to the user assembling the type generic graphical program, data structures may be created and stored which represent the type generic graphical program. The nodes may be interconnected in one or more of a data flow, control flow, or execution flow format. The type generic graphical program may thus comprise a plurality of interconnected nodes or icons which visually indicates the functionality of the type generic graphical program.

In some embodiments, the type generic graphical program may comprise a virtual instrument (VI) or may be used as a VI/sub-VI in another graphical program. For example, in one embodiment, the type generic graphical program (or an instantiation of the type generic graphical program), e.g., the sub-VI, may be represented in another graphical program as a node. The node representing the graphical program may include one or more inputs and one or more outputs.

As noted above, the type generic graphical program may comprise a block diagram and may also include a user interface portion or front panel portion. Where the type generic graphical program includes a user interface portion, the user may optionally assemble the user interface on the display. However, in some embodiments, the programming environment (or another program) may automatically generate the user interface based on the creation of the block diagram portion described above. As one example, the user may use the LabVIEW graphical programming development environment to create the type generic graphical program (e.g., the block diagram and/or the graphical user interface, e.g., the front panel, portion of the graphical program).

In an alternate embodiment, the type generic graphical program may be created by the user creating or specifying a prototype, followed by automatic or programmatic creation of the type generic graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein.

Figure 7:
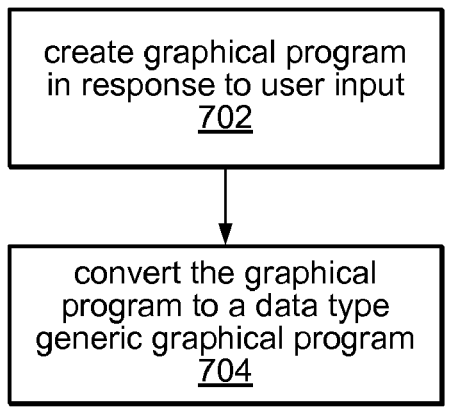
FIG. 7 is a flowchart diagram illustrating one embodiment of a method for converting a graphical program with specified data types to a type generic graphical program.

Note that in these embodiments, the type generic graphical program may be created without one or more specified types. The type generic graphical program may be created in various manners, either by the user or automatically, as desired. The type generic graphical program may implement a measurement function that is desired to be performed by the instrument. Thus, the type generic graphical program may be stored in response to creation or user assembly of the graphical program. Alternatively, the type generic graphical program may be stored in response to conversion from a type-specific graphical program (or a different type generic graphical program), e.g., using the methods described below in FIG. 7. In other words, as shown in FIG. 7, the type generic graphical program may be stored as a result of a conversion of a type specific graphical program to a type generic graphical program.

In one embodiment, the type generic graphical program may include type associations between nodes, wires, terminals, inputs, and/or outputs of the type generic graphical program. For example, the type of an output of a node in the type generic graphical program may be associated the type of another input in the type generic graphical program. In one embodiment, the type association may be direct; in other words, the types may be both type generic, but may have a type association such that assignment of a type to one results in association of the same type to the other. Alternatively, the types of various elements of the type generic graphical program may be linked by rules. For example, a first terminal may be associated with a second terminal according to a rule, e.g., the bitwidth of the data type of the first terminal may be a factor of two greater than the data type of the second terminal. Thus, a direct association may tie the data types in a one-to-one relationship, while an indirect association may define a rule or set of rules (or other relationship) between two data types.

Associations between data types of elements of the type generic graphical program may be implemented using type variables or nodes (where the user may configure the type variable for an element of the type generic graphical program to reflect the desired association), via textual means, or other means. For example, a user may simply add a label to each element of the type generic graphical program that needs an association. As one example, the user may specify a label with a first output ("G1"), a second label with a first input ("G2"), and a third label with a second input ("G1"). These labels may indicate that the first output and second input have the same types. Furthermore, the labels may include a syntax for specifying a relationship. For example, the user may specify a label for a second output ("G2, Bitwidth@G1") indicating that the second output has the data type of the first input with the bitwidth of the first output. Alternatively, the specification of the associations may be achieved through graphical means, e.g., using various GUIs or graphical programs.

In 504, user input specifying one or more data types of at least one input and/or at least one output of the type generic graphical program may be received. In some embodiments, the user input specifying the one or more data types of the input and/or the output of the type generic graphical program may include the user connecting one or more inputs or outputs of the type generic graphical program to nodes in a second graphical program. For example, in one embodiment, the type generic graphical program may be included in the second graphical program as a sub-VI. Thus, the inputs and outputs of the type generic graphical program (which may be represented as a node in the second graphical program) may be wired or connected to other nodes in the second graphical program. Correspondingly, the data types associated with the other nodes or wires in the second graphical program which are coupled to the type generic graphical program may be specified for the inputs and/or outputs of the type generic graphical program. For example, if a node in the second graphical program is connected to an input of the type generic graphical program, the data type corresponding to the node or the wire connected to the node and the input may be specified as the data type of the input of the type generic graphical program. Thus, in one embodiment, the user may connect the type generic graphical program to one or more nodes in another graphical program which have associated data types, and those data types may specify data types for the type generic graphical program.

Note that in some embodiments, the data types may not always be a one to one relationship, but may be related by functions or other links. In other words, specifying a data type by connecting the graphical program may not create a one-to-one relationship between the data type in the graphical program and the specified data type for the type generic graphical program. For example, in one embodiment, an input in the type generic graphical program may be coupled to a node or value which has an associated integer data type. In this example, the integer may not be the specified data type for the input of the type generic graphical program (although in some embodiments, this may be the case). Instead, the data type of the input in the type generic graphical program may be set to a corresponding data type such as a double or floating point, e.g., based on a pre-specified function or the data type propagation that is performed. Thus, in some embodiments, connecting an input or output of the type generic graphical program to another node may not specify the exact data type of the node or wire, but may instead specify a related or corresponding data type.

In one embodiment, receiving user input specifying data types for the type generic graphical program may include receiving user input to one or more input controls or output indicators of the type generic graphical program, e.g., the GUI of the type generic graphical program. Further descriptions and embodiments are provided below with respect to the remaining Figures.

In some embodiments, receiving user input specifying data types for the type generic graphical program may include receiving user input to a menu of a GUI associated with the type generic graphical program. For example, in one embodiment, the user may be able to select a node, input, or output of the type generic graphical program and select a data type, e.g., in a pop-up menu or other GUI, for the node, input, or output. For example, the user may right click on a node or wire, which causes a menu or other GUI to be displayed that is useable to select a data type. As another example, the user may specify the data type(s) for inputs, outputs, nodes, wires, terminals by providing input to a wizard (e.g., a series of GUIs for specifying the data types).

Note that the above described methods for specifying data types are exemplary only and that other methods or procedures are envisioned. For example, in one embodiment, the data types may be specified automatically based on the context of the graphical program to which the type generic graphical program was associated.

In 506, the specified data types may be associated with the type generic graphical program (e.g., an instance of the type generic graphical program), e.g., in response to the user input received in 504. Associating the specified data types may comprise modifying code and/or data structures of the respective input(s), output(s), or node(s) in an instantiation or instance of the type generic graphical program to reflect the newly assigned data types. In one embodiment, the type generic graphical program may be a software class, and an instance of the class may be created and then modified as described herein.

Associating the specified data types may include automatically converting or assigning the specified data types to the input(s), output(s), or node(s) specified or selected by the user. In some embodiments, the method may include automatically propagating the specified data types to other inputs, outputs, or nodes in the type generic graphical program, e.g., to fully specify types for the type generic graphical program, thus resulting in a type specific graphical program. However, in some embodiments, some inputs, outputs, or nodes of the graphical program may remain type generic.

Type propagation may occur at edit time, compile time, load time, and/or at any other time. In one embodiment, type propagation may typically be performed at edit time, e.g., at the end of each user edit transaction. Alternatively, or additionally, type propagation may occur when you load or save the graphical program, and/or load or save other graphical programs associated with the graphical program.

Propagating the specified types may include assigning the specified types to the various inputs, outputs, or nodes in the type generic graphical program. For example, in one embodiment, if an input of the type generic graphical program is assigned to a string data type, a coupled or connected node may also be specified/assigned as a string a data type. However, similar to above, propagating the specified data types may not result in one-to-one assignments of the specified data types. For example, if an input is assigned to a data type of an integer of length 4 and this is provided as input to a multiply node in the graphical program with another input having an integer of length 8 data type, the output of the add node may not be an integer of length 4 or 8, but may instead be another value, e.g., 12. However, in some embodiments, the bit-width or other data type propagation may be performed intelligently using context and functionality of the graphical program to determine optimal data types or lengths of data types for outputs of certain nodes or VIs. Thus, the output in the above example may be assigned to a value lower than the maximum possible length, such as the value of the highest input length, in this case, 8.

Furthermore, propagating the specified types may be performed by implicit relationships between nodes in the graphical program. For example, in one embodiment, assigning the data type of an input of the graphical program may assign the data type (or class of data types) for another input in the graphical program. This may be achieved by propagating data types throughout the graphical program, e.g., by propagating the data types through each immediately coupled node or wire, and then back propagating those data types to nodes or wires that also connect to the immediately coupled node or wire. For example, where a specified data type, e.g., a double, is connected an add node, the double may be propagated to the output of the add node, and to any wires also coupled to the add node, thereby back propagating the data type to other nodes in the graphical program. Thus, propagation of the data types may apply to nodes that aren't connected to the specified input, output, or node.

Furthermore, in some embodiments, the data type propagation may use data type associations, e.g., type variables, such as those described above. Thus, when a node or wire which is linked through an association or type variable with another node or wire and is assigned with a type, that type may be propagated to the other node or wire according to the association or type variable.

In some embodiments, propagation of data types (or analysis of the type generic graphical program to determine types in general) may include analysis of the functions or primitives used in the graphical program. For example, an add node or function (unless overloaded) may only accept certain types of inputs (e.g., numeric data types). Correspondingly, propagation of the data types may include analysis of the functions; in this case, it may be easily determined that the data types of the inputs and outputs of the add node may necessarily be numeric.

In some embodiments, the method may further include propagation of attributes of types of the graphical program. For example, where the graphical program includes one or more nodes that are constants (i.e., where the value does not change over time), that information may be propagated throughout the graphical program. In one embodiment, this type attribute propagation may be referred to as "constant attribute propagation". Constant attribute propagation may apply to the entirety of the graphical program (e.g., over the wires connected to the constants, and through controls and indicators connected to wires that carry constant attribute information thereby including propagation through VIs or sub-VIs which are represented as single nodes or icons in the graphical program). Propagation of attributes of the data types may allow for optimization of the graphical program's code. For example, where constant information is propagated throughout the graphical program, case structures involving the constant may be simplified or eliminated using the information that the data coming in is a constant. As a simple example, where the graphical code includes a case structure which codes 2 frames, one if the incoming Boolean data is true and one if the incoming Boolean data is false, the entire case structure can be removed and replaced with the code for the true case if the incoming data is true and is inferred as a constant through constant attribute propagation.

Constant attribute propagation may be achieved through analysis of the graphical program (e.g., by tracing a constant throughout the path of the graphical program) or by passing constant information on wires (e.g., to allow the next node or function to be optimized easily using the constant information).

Figure 6:
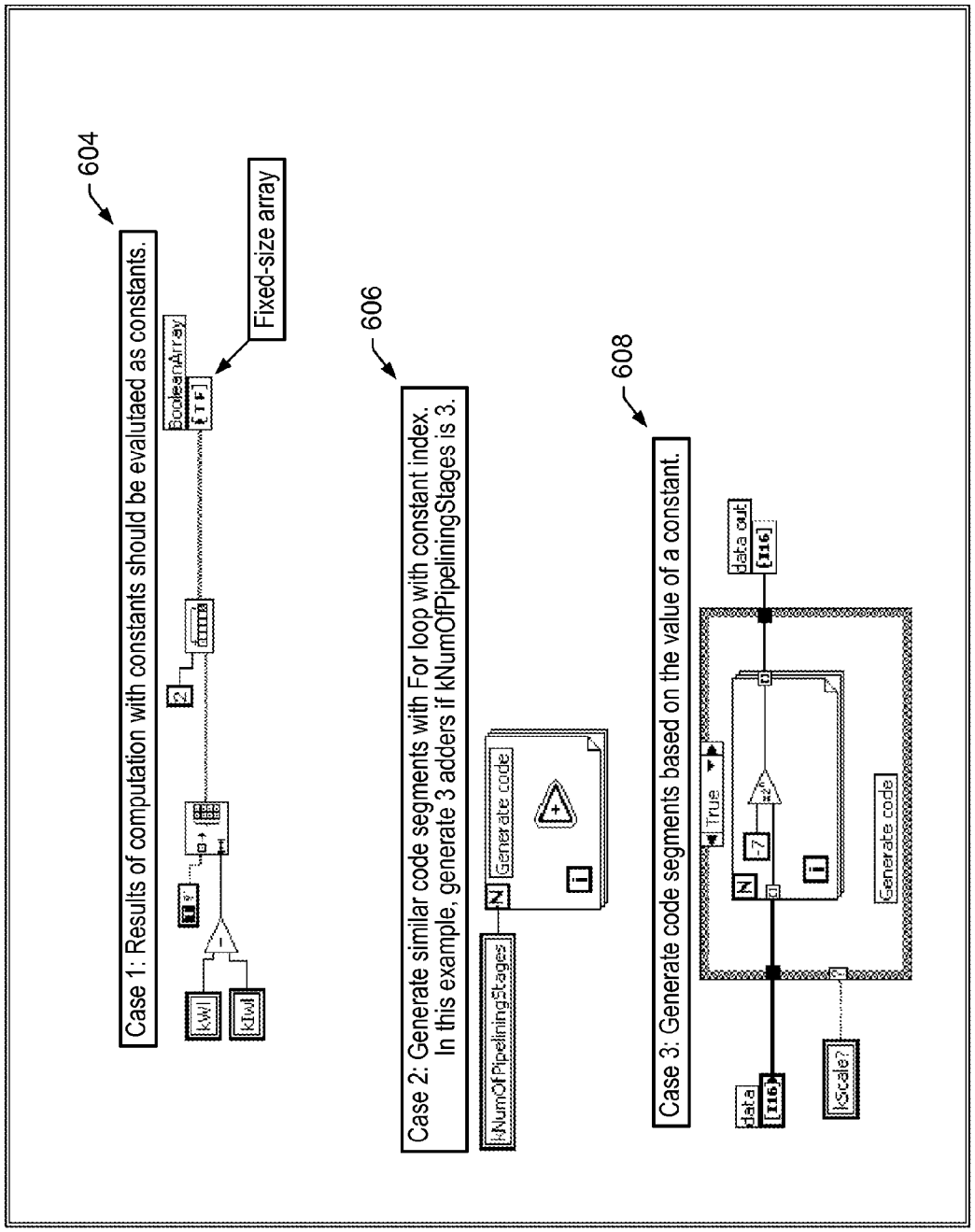
FIG. 6 illustrates exemplary use cases of type generic structures and constant information according to one embodiment.

For example, FIG. 6 illustrates exemplary uses of constant attribute propagation. The controls shown may carry information about whether connected data (or data provided) is constant. 604 illustrates an exemplary case where computation on inputs (kwl—constant and kwi—constant) that have constant attribute information propagated to them generate constant results (BooleanArray—constant). 606 illustrates a case where similar code segments are generated using constant information (from kNumOfPipeliningStages—constant). Finally, 608 illustrates a case where code segments may be generated using values of a constant attribute propagated input (through kScale?—constant). Note that the embodiments described above regarding constants may be applied to other attributes of types as well. Such optimizations (e.g., at compile time or edit time) may be especially useful for designing optimized and logic efficient programmable hardware elements.

Furthermore, as indicated above, in one embodiment, after associating the data types with the type generic graphical program, the type generic graphical program may include one or more type generic inputs, outputs, or nodes (e.g., those for which the user did not specify data types). Thus, associating the data types with the type generic graphical program may result in another type generic graphical program. Alternatively, if the types are propagated to all of the nodes, inputs, and outputs of the type generic graphical program, associating the data types may result in a typed graphical program.

Note that once the data types are associated with the type generic sub-VI, it may be possible for the sub-VI to react and/or adjust to data types other than the specified ones. For example, where the sub-VI may be specified to accept two numbers and add them (in an extremely simple case), the sub-VI may be operable to accept other data types such as arrays or clusters and attempt to perform the same function on those data types. Following this example, the sub-VI might receive an array of numbers, e.g., {1, 2, 3, 4}, as one input, and an integer as another, e.g., 2. Correspondingly, instead of outputting an error, the sub-VI might adjust and output the following array {3, 4, 5, 6}. Thus, the sub-VI may be able to adjust its functionality and outputs based on inputs that are not of the expected type.

The method may further include instantiating the type generic graphical program in another graphical program. As used herein, "instantiation" refers to the creation of code and/or data structures in a program which corresponds to a defined or specified data structure (e.g., a function or VI). Additionally, once instantiated, the created code/data structures may be referred to as an "instantiation" of the defined code/data structure (e.g., an instantiation of a sub-VI). For example, a user may instantiate a sub-VI in a graphical program by including the sub-VI in the graphical program and connecting wires (e.g., from nodes) to the inputs and/or outputs of the sub-VI. Similarly, the type generic graphical program may be instantiated by including the type generic graphical program as a sub-VI in the graphical program and connecting wires to the inputs and/or outputs of the sub-VI.

Note that instantiation of the sub-VI may occur after it is included in the graphical program, but before it is connected to nodes in the graphical program. In these embodiments, associating the data types by connecting the nodes of the graphical program to inputs and/or outputs of the type generic sub-VI may convert the sub-VI to a typed version of the type generic sub-VI. In some embodiments, upon instantiation, default values (e.g., as specified by the user at creation) may be used for the data types, and these data types may change in response to being connected to different data types. Alternatively, the type generic sub-VI may not be fully instantiated until data types are specified for the inputs and/or outputs of the sub-VI, e.g., by coupling them to other nodes or wires in the graphical program. Thus, instantiation of the type generic graphical program may refer to the inclusion of the type generic graphical program as a sub-VI in another graphical program.

In one embodiment, the user may specify different desired functionality or implementations of a program for specific combinations of type generics (e.g., classes of type generic data types) and specific data types. For example, the user may specify a plurality of graphical subprograms (at least including one type generic graphical program) for different types of inputs. More specifically, the user may specify a single type generic graphical subprogram for a class of type generics, e.g., integers, and another type generic graphical subprogram for another class, e.g., floating point. Alternatively, the user may specify, in addition to a type generic graphical subprogram, a type specific graphical subprogram for a specific data type, e.g., for strings.

Note that in some embodiments the type generic graphical program may be included as a subprogram, e.g., in a polymorphic graphical program. For example, the user may specify a program for combining two values whose implementation and output type are different based on the input data types. When both the inputs are numeric type, the program would perform an addition of the two provided values. When both the inputs are strings, the implementation would concatenate the strings. As indicated above, this behavior may be achieved by specifying a numeric type generic graphical subprogram and a string (type generic or specific) graphical subprogram. Thus, when the assigned data type is numeric, the numeric type generic graphical subprogram may be used (e.g., as instantiated for the specific data type), and when the assigned data type is a string, the string subprogram may be used. Note that in this example the type generic graphical program is specific to the numeric type class, and is a subprogram of another program. In this example, for the subprogram created for the numeric class, the subprogram is executable to perform the functionality for a plurality of different types (in this case numeric types) and the subprogram comprises one set of graphical code that performs the functionality for these plurality of different types.

Additionally, or alternatively, the user may also specify different functionality or implementations for different data types by including data type checking code in the type generic graphical programs. For example, the type generic graphical program may include case structures or logic that may select different behavior in the graphical program based on the assigned or specified data types, e.g., for an instance of the type generic graphical program. In some embodiments, the functions may be overloaded to handle multiple data types and/or functionality.

Alternatively, achieving this type checking behavior may be based on type-checking code specified for the type generic graphical program. For example, the type checking code or logic may specify use of the concatenate function when the input type is a string and the add function when the input type is numeric. In some embodiments, this may require user input specifying different cases for the type generic graphical program. Alternatively, similar behavior may be achieved by overloading functions (e.g., the function nodes in the type generic graphical program). Following the example from above, an addition function may be overloaded to include concatenation, thereby allowing strings and numbers to be "added" using the same type generic graphical program. Note that these descriptions are exemplary only and other methods are envisioned. Any other input types that are incompatible with the operation may generate a compile or edit-time error. However, in some embodiments, the graphical program may be automatically modified or created to deal with other types (e.g., other than the one's originally specified or created for by the user).

For example, in some embodiments, the method may include analyzing the one or more types specified to the graphical program to determine the desired functionality and adapting or modifying the graphical program, e.g., upon instantiation, resulting in an appropriate graphical program which implements the functionality for the specified one or more data types. This modification or adapting may happen even when the specified one or more data types are not of the types for which the type generic graphical program was initially created. For example, the type generic graphical program may have been initially created for numeric data types, and the method may analyze or modify the type generic graphical program such that the same functionality may work with other data types such as, for example, strings. Such actions may be performed instead of showing a "broken" VI or graphical program.

In some embodiments, the method may further include analyzing the instantiations of the type generic graphical program (or type generic sub-VI) in the graphical program. For example, the method may include determining which instantiations are identical, i.e., which instantiations have the same data types, and replacing one or both of the instantiations to a reference of the type generic sub-VI with those data types. This determination may be performed at any of the times described above regarding type propagation (e.g., edit time, load time, compile time, etc.). Determination of the identical instantiations may be performed at the same time as or independently of type propagation. Thus, the method may optimize graphical program size and/or performance by replacing identical instantiations with references to a single instantiation, e.g., during type propagation. Further details are provided below in reference to FIG. 13. This may serve to optimize/reduce the footprint of the resulting program, e.g., to reduce memory storage requirements (for processor execution) or to reduce gate utilization (in FPGA implementations).

When data types are associated/propagated in 506, the wires in the graphical program instance may change appearance to visually indicate the new data types that have been assigned. In one embodiment, the wires may be modified with a color, pattern, shape, size, etc. to visually indicate the new data types that have been assigned. In a similar manner, nodes, inputs and/or outputs may change appearance as well to reflect the new data types. Also the icon that represents the graphical program instance may receive a new visual appearance to reflect the association of the data types.

In 508 the resulting graphical program may be stored, deployed for execution, and/or executed. For example, the resulting graphical program may be executed on a computer system, either as a stand-alone graphical program or as a sub-graphical program (sub-VI) of another graphical program.

In one embodiment, the method may include generating a hardware description based on the graphical program (e.g., the graphical program which includes the type generic sub-VI, or the type generic graphical program itself, among others). The hardware description may be usable to configure a programmable hardware element, such as a field-programmable gate array (FPGA). Thus, the method may further include configuring a programmable hardware element using the hardware description to produce a configured programmable hardware element. The configured programmable hardware element may implement at least the functionality specified by the type generic graphical program. Further details regarding implementation of graphical programs onto programmable hardware elements can be found in the above incorporated-by-reference U.S. Pat. No. 6,219,628 titled "System and Method for Configuring an Instrument to Perform Measurement Functions Utilizing Conversion of Graphical Programs into Hardware Implementations," filed Aug. 18, 1997.

The use of type generic graphical program may provide many benefits over previous graphical programming methods, especially when applied to programmable hardware elements. For example, using type generic graphical programs, creating code for each particular bit-width of the graphical program may be especially easy as the functionality of the type generic graphical program may apply to any bit-width, thus reducing user programming time. Thus, using type generic graphical programming, the user may create graphical programs with more ease and with more efficiency (both in user creation and graphical program execution) than using previous methods.

FIG. 7—Converting a Graphical Program to a Type Generic Graphical Program

FIG. 7 illustrates a method for converting a graphical program with specified data types to a type generic graphical program. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 702 a graphical program may be stored/created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program.

The nodes may be interconnected in one or more of a data flow, control flow, or execution flow format. The graphical program may thus comprise a plurality of interconnected nodes or icons which visually indicates the functionality of the graphical program.

Each of the nodes in the graphical program may have associated data types. For example, each of the nodes in the graphical program may receive, via connections or wires in the graphical program, one or more inputs. These inputs and/or wires may have associated data types such as integer, floating point, double, string, array, etc. Alternatively, the nodes in the graphical program themselves may have their own data types, e.g., as an attribute of the node. In some embodiments, the graphical program may comprise a virtual instrument (VI) or may be used as a VI/sub-VI in another graphical program. For example, in one embodiment, the graphical program, e.g., the sub-VI, may be represented in another graphical program as a node. The node representing the graphical program may include one or more inputs and one or more outputs. Similar to descriptions above, each of the inputs and outputs may have associated data types.

As noted above, the graphical program may comprise a block diagram and may also include a user interface portion or front panel portion. Where the graphical program includes a user interface portion, the user may optionally assemble the user interface on the display. However, in some embodiments, the programming environment (or another program) may automatically generate the user interface based on the creation of the block diagram portion described above. As one example, the user may use the LabVIEW graphical programming development environment to create the graphical program (e.g., the block diagram and/or the graphical user interface, e.g., the front panel, portion of the graphical program).

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or automatically, as desired. The graphical program may implement a measurement function that is desired to be performed by the instrument. Thus, the graphical program may be created in response to user input and may have associated data types.

In 704, the graphical program may be converted to a data type generic graphical program. In various embodiments, the inputs, outputs, and/or nodes of the type generic graphical program may all be type generic, i.e., with no data types associated. However, in some embodiments, as described below, the type generic graphical program may include at least one input, output, and/or node with an associated data type and at least other input, output, and/or node that is type generic. Thus, a type generic graphical program may refer to a graphical program which includes one or more inputs, outputs, or nodes that are type generic. Thus, in one embodiment, the converted type generic graphical program includes at least one type generic input or output and at least one statically typed input or output. Alternatively, each of the one or more inputs and outputs of the type generic graphical program may be type generic.

Converting the graphical program to a type generic graphical program may be performed in response to user input. In some embodiments, converting the graphical program may include removing specified data types from one or more nodes, inputs, or outputs from the graphical program, thus creating a corresponding type generic graphical program. As indicated above, this may apply to a subset or all of the nodes, inputs, or outputs of the graphical program.

Additionally, the graphical program may be converted to a specified class of type generic graphical program, e.g., a numeric type generic graphical program, a textual type generic graphical program, etc. Alternatively, the graphical program may be converted to a type generic graphical program that can only be instantiated with specific types, e.g., as specified by user input. For example, the graphical program may be originally specified as a double graphical program, but when converted to a type generic graphical program, the type generic graphical program may be limited to a numeric type generic graphical program. In this case, the numeric type generic graphical program may only accept numeric types and may not accept other data types such as strings, Booleans, etc. As another example, the user may simply specify the data types that may be associated with the graphical program such that the type generic graphical program is not "completely" type generic, but is type generic to the specified data types.

In some embodiments, the previous data types of the converted graphical program may be stored, e.g., as default data types for the type generic graphical program. Thus, instantiation of the graphical program may use the default data types if no other input specifying data types is provided. Thus, "default data types" may refer to the data types that may be used when a type generic graphical program is converted or instantiated when no specific data types have been specified. For example, when input has specified data types for a subset of the nodes in the graphical program, the remaining data types may be instantiated using the default data types. Alternatively, the unspecified data types may remain type generic.

Thus, a graphical program which has associated data types may be converted to a type generic graphical program. Note that the above descriptions may also apply to conversion of a type generic graphical program to another type generic graphical program. For example, a first type generic graphical program having one or more nodes, inputs, or outputs with specified data types may be converted to a second type generic graphical program having no nodes, inputs, or outputs with specified data types. Alternatively, the first graphical program having one or more nodes, input, or outputs with associated specified data types may be converted to a second type generic graphical program having nodes, inputs, or outputs with specified data types where the second type generic graphical program has different specified data types. In this embodiment, the different specified data types may be in reference to nodes, inputs, or outputs of the first graphical program and/or other nodes, inputs, or outputs of the first graphical program. In other words, the second type generic graphical program may be any type generic graphical program that is based on but not identical to the first graphical program.

The type generic graphical program may then be utilized, e.g., according to the methods described above with respect to FIG. 5.

Figure 8:
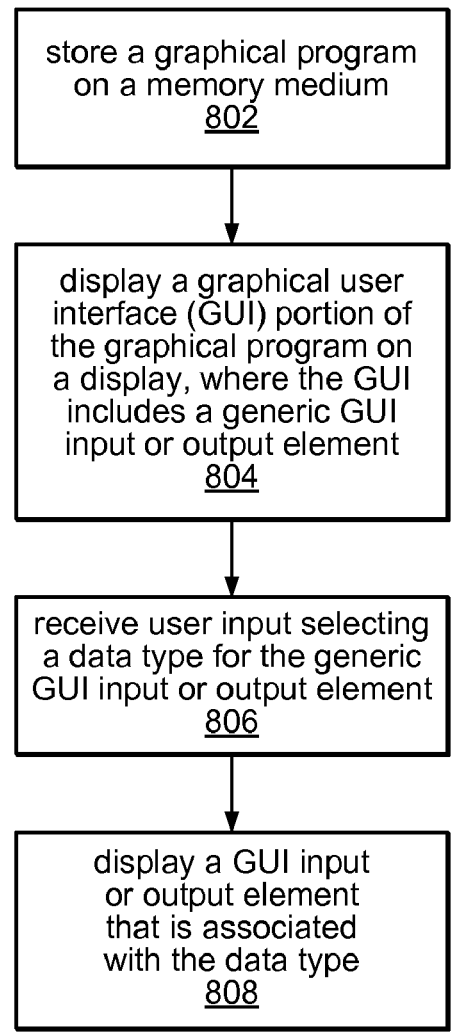
FIG. 8 is a flowchart diagram illustrating one embodiment of a method specifying data types for a graphical program using a GUI portion of the graphical program.

FIG. 8—Specifying Data Types for a Type Generic GUI of a Type Generic Graphical Program FIG. 8 illustrates a method for specifying data types for a type generic GUI of a type generic graphical program. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, a graphical program may be stored on a memory medium. The graphical program may be a type generic graphical program. Thus, in various embodiments, the inputs, outputs, and/or nodes of the type generic graphical program may all be type generic, i.e., with no data types associated. However, in some embodiments, as described above, the type generic graphical program may include at least one input, output, and/or node with an associated data type and at least other input, output, and/or node that is type generic. Thus, a type generic graphical program may refer to a graphical program which includes inputs, outputs, or nodes that are type generic. In some embodiments, the type generic graphical program may be created according to methods described above, e.g., as described in FIGS. 5 and/or 6.

In 804, a GUI portion of the type generic graphical program may be displayed on a display. The GUI portion may include a type generic input or output GUI element. Similar to descriptions above, a type generic input or output GUI element refers to and input or output element which is type generic. Thus, the GUI portion of the type generic graphical program may be linked to the data types in the type generic graphical program. Correspondingly, the input controls and output indicators may have the same data types (or are type generic) as the nodes, inputs, or outputs, to which the GUI elements control or indicate.

In 806, user input may be received which specifies a data type for the type generic input or output GUI element. In some embodiments, the user input may be received directly to the GUI element or the GUI portion of the graphical program. For example, the user may select the GUI element and then specify a desired data type for the GUI element, e.g., by using a pop-up menu or other GUI.

Alternatively, the user input may be received to the type generic graphical program itself, such as is described above regarding FIG. 6. For example, the user may specify and associate data types with the inputs, outputs, or nodes of the graphical program by instantiating the type generic graphical program as a sub-VI in another graphical program and connecting the inputs or outputs of the type generic sub-VI with other nodes in the graphical program. Alternatively, or additionally, the user may directly specify data types for one or more nodes, inputs, or outputs in the graphical program using various methods, including, but not limited to, GUIs, text boxes, etc. When a data type is specified for a corresponding node, input, or output, each GUI element may be associated with the data type (or a corresponding data type). In other words, if an input indicator is associated with a node in the type generic graphical program, when a data type is specified for the node (e.g., directly, through propagation, or other means), that data type (or a corresponding data type) may be associated with the input indicator. This may apply to each of the GUI elements in the GUI portion of the graphical program.

In 808, an input or output GUI element may be displayed in response to the user input specifying the data type. Thus, the input or output GUI element may be associated with the data type specified by the user and may correspond to the type generic input or output GUI element displayed in 704. In some embodiments, the GUI element may be modified to indicate the change in data type. For example, where the type generic GUI element included a non-descript text box, when a Boolean data type is specified, the GUI element may be replaced with a Boolean GUI element. Thus, a corresponding input or output GUI element may be displayed in response to the user specifying a data type for a type generic GUI element.

FIGS. 9-15—Exemplary Graphical Programs

Figure 9:
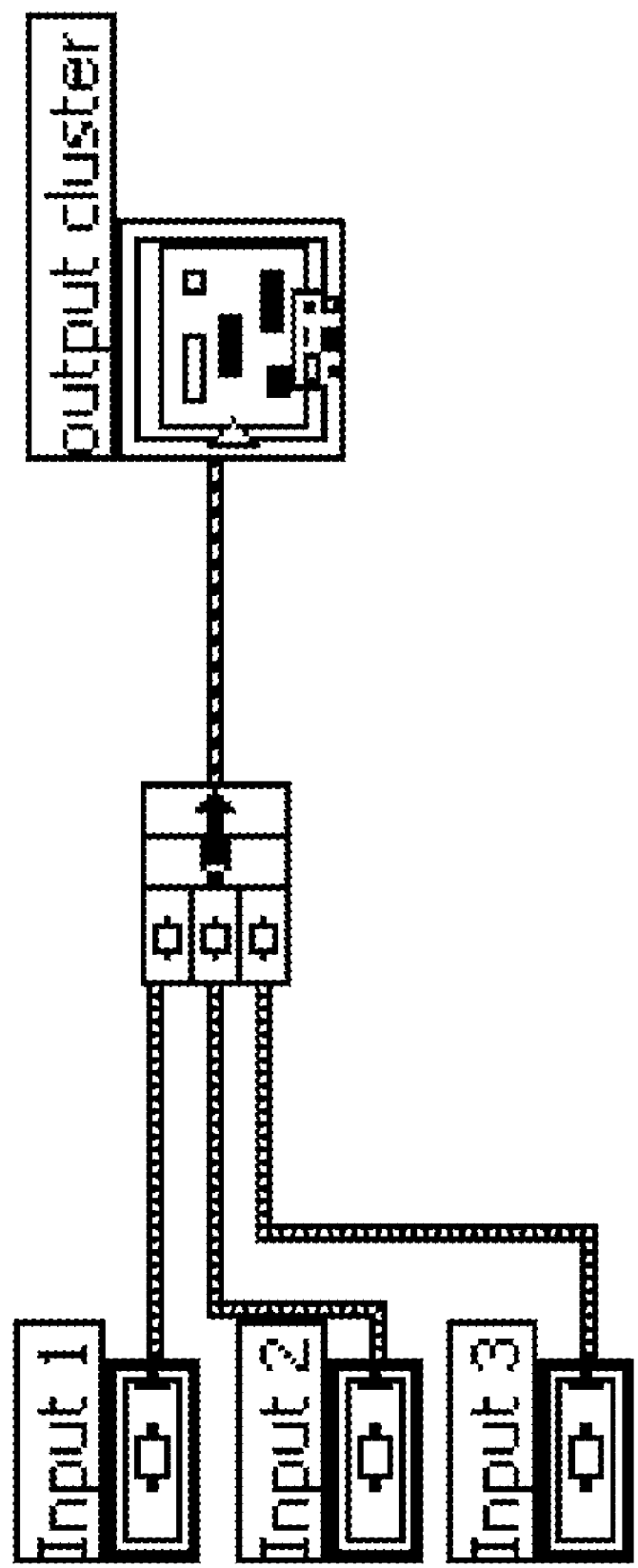
FIG. 9 is an exemplary graphical program with associated data types.

FIG. 9 illustrates an exemplary type-type generic graphical program 900. As shown, the graphical program 900 includes three inputs, input 1, input 2, and input 3, which are coupled to a bundle node. The bundle node bundles these three inputs and provides an output cluster. As shown, the inputs are type generic inputs. Similarly, the output cluster is a cluster containing 3 type generic elements, and hence, itself type generic. Using the methods described above, e.g., regarding FIG. 5, this type generic graphical program may be converted to a graphical program with specified data types using any of the methods or processes described above, among others.

Figure 10:
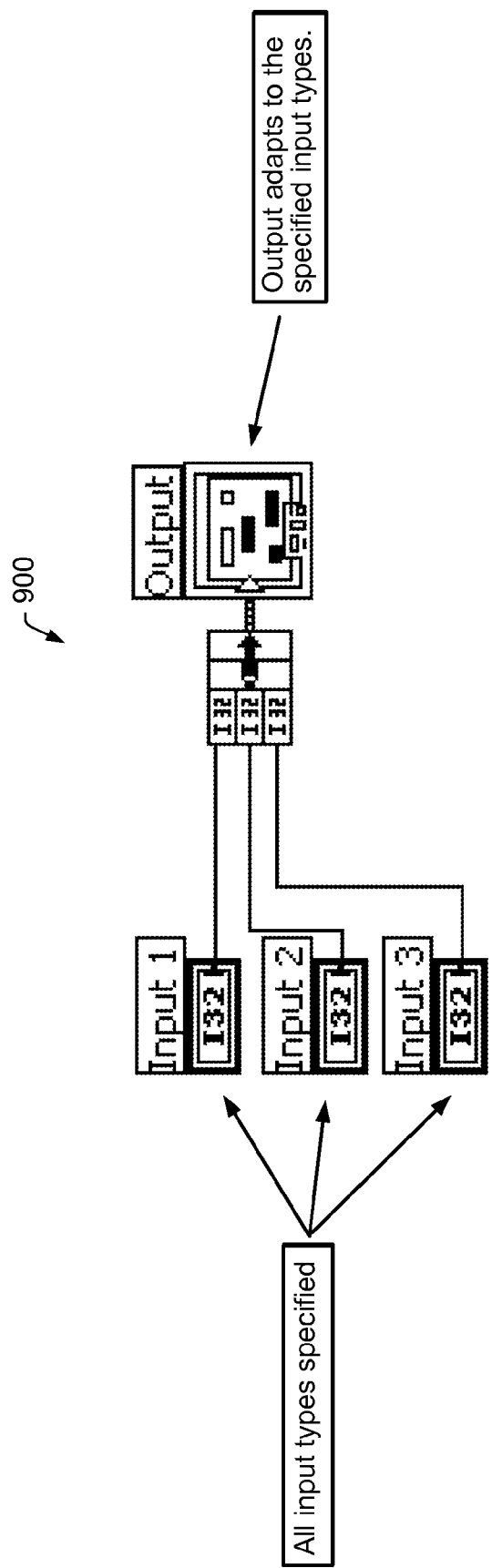
FIG. 10 illustrates an exemplary converted type generic version of the graphical program corresponding to FIG. 9.

FIG. 10 illustrates an exemplary converted type-specific version of the graphical program 900. As shown in the Figure, the inputs each have associated data types—32-bit integers for the inputs. The output adapts itself to the input types and generates a 3 element cluster of 32-bit integers.

Further, the type generic inputs, in FIG. 9, may have default data types, for e.g. 32-bit integer type. In other words, FIG. 10, may also be construed to represent a type generic graphical program with default data types associated with all of its inputs.

Figure 11:
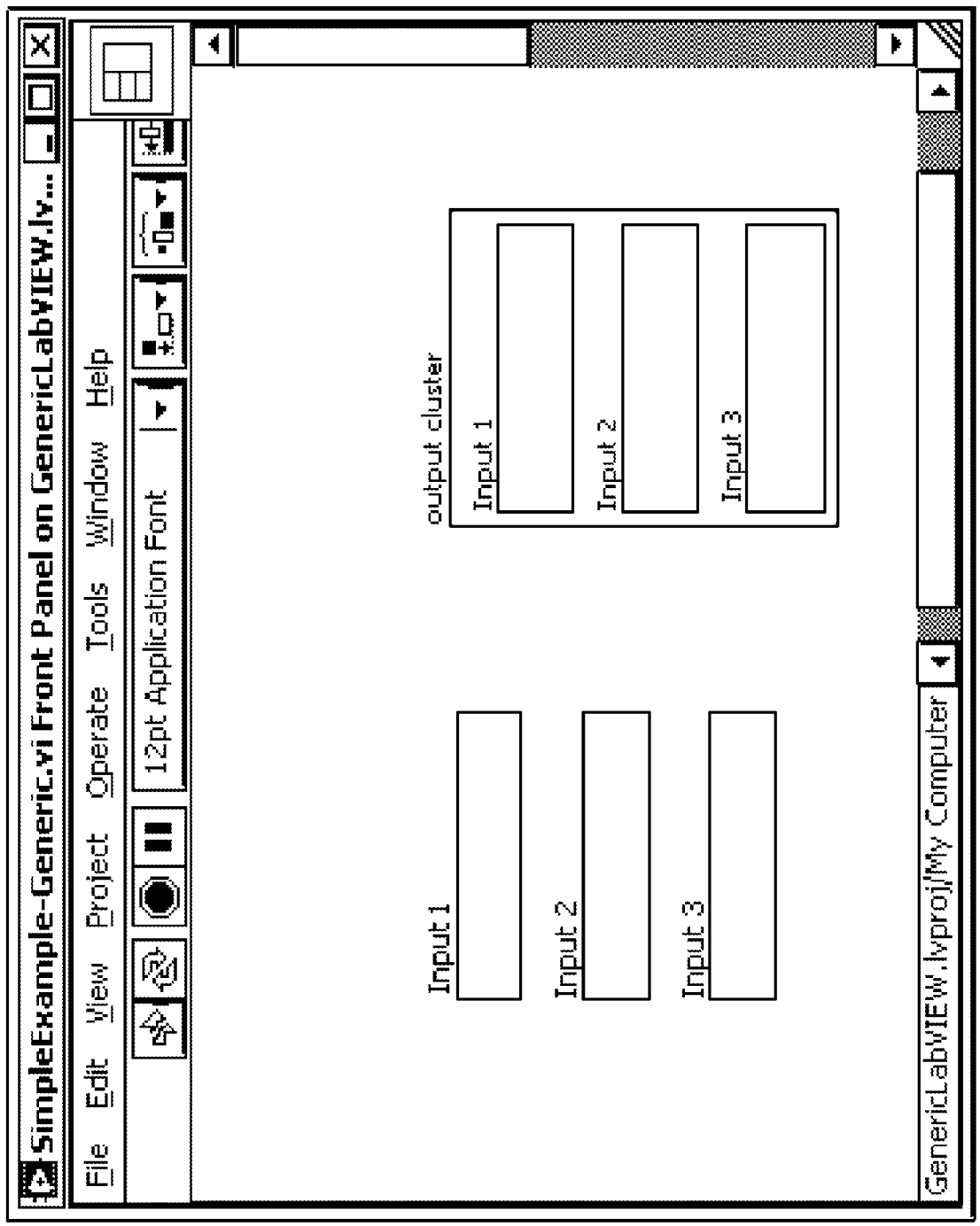
FIG. 11 illustrates an exemplary type generic front panel of the type generic graphical illustrated in FIG. 10.

FIG. 11 illustrates an exemplary type generic front panel of the type generic graphical illustrated in FIG. 9.

Figure 12:
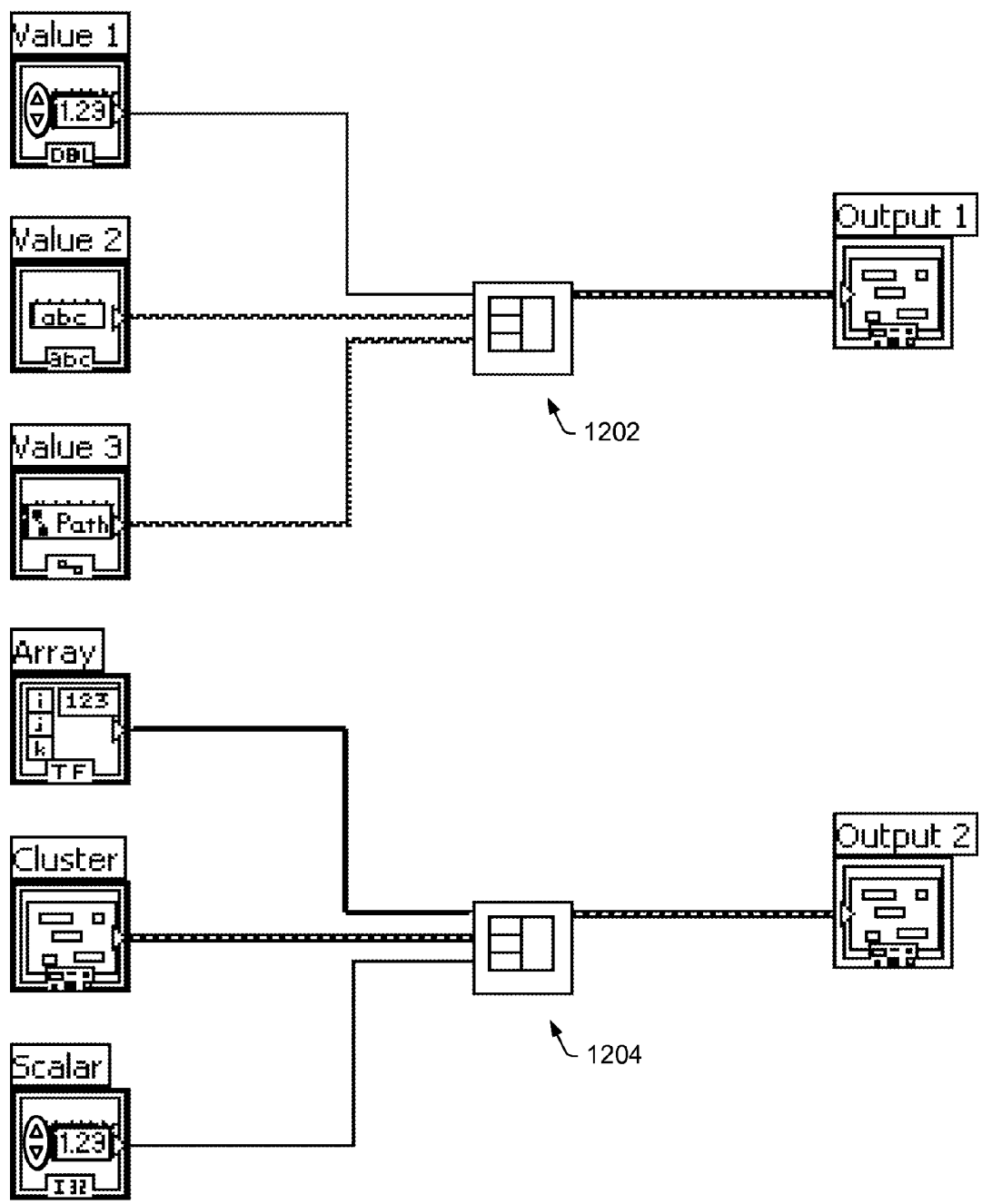
FIG. 12 is an exemplary graphical program corresponding to FIG. 9 which has been instantiated twice with corresponding different data types.

FIG. 12 illustrates an exemplary graphical program with two sub-VI instantiations of a type generic version of the graphical program 900, labeled as 1202 and 1204 in the Figure. As shown, a double (Value 1), a string (Value 2), and a path (Value 3) are connected to the first three inputs of the instantiation 1202. Correspondingly, the instantiated sub-VI 1202 provides a clustered output with a double, a string, and a path to output 1. Similarly, sub-VI instantiation 1204 receives an array, a cluster, and a scalar, and provides a clustered output of these values and data types to output 2. Thus, FIG. 12 illustrates two instantiations of a type generic graphical program. As shown, the type generic graphical program can be used as a sub-VI and can adapt inputs and outputs based on specified data types. In this case, the user connecting the three inputs specifies the data types which are then propagated to provide a corresponding clustered output data type. Thus, the user can instantiate the same type generic VI two times (having only created a single type generic VI) and the two instantiations can receive different inputs and provide different outputs without requiring further graphical programming on the users part.

Figure 13:
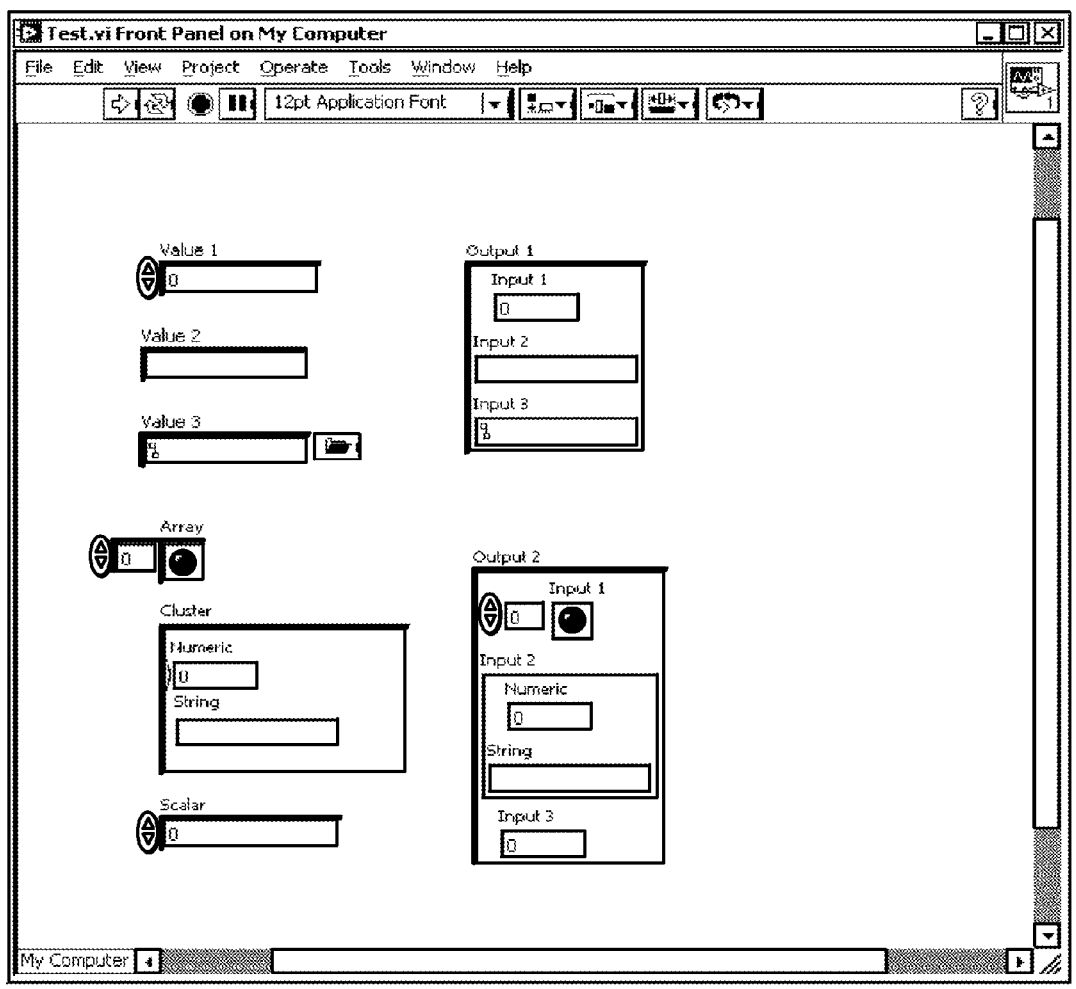
FIG. 13 is an exemplary front panel corresponding to the graphical program of FIG. 12.

FIG. 13 illustrates an exemplary graphical front panel corresponding to the graphical program of FIG. 12. As shown, the two instantiations 1202 and 1204 have different corresponding front panels in response to the specification of the data types (e.g., from value 1, value 2, value 3, array, cluster, and scalar illustrated in FIG. 12). As noted above, these two front panels may be instantiated from the same type generic graphical program without requiring further user input designing or specifying the front panels (e.g., the differences in the front panels).

Figure 14:
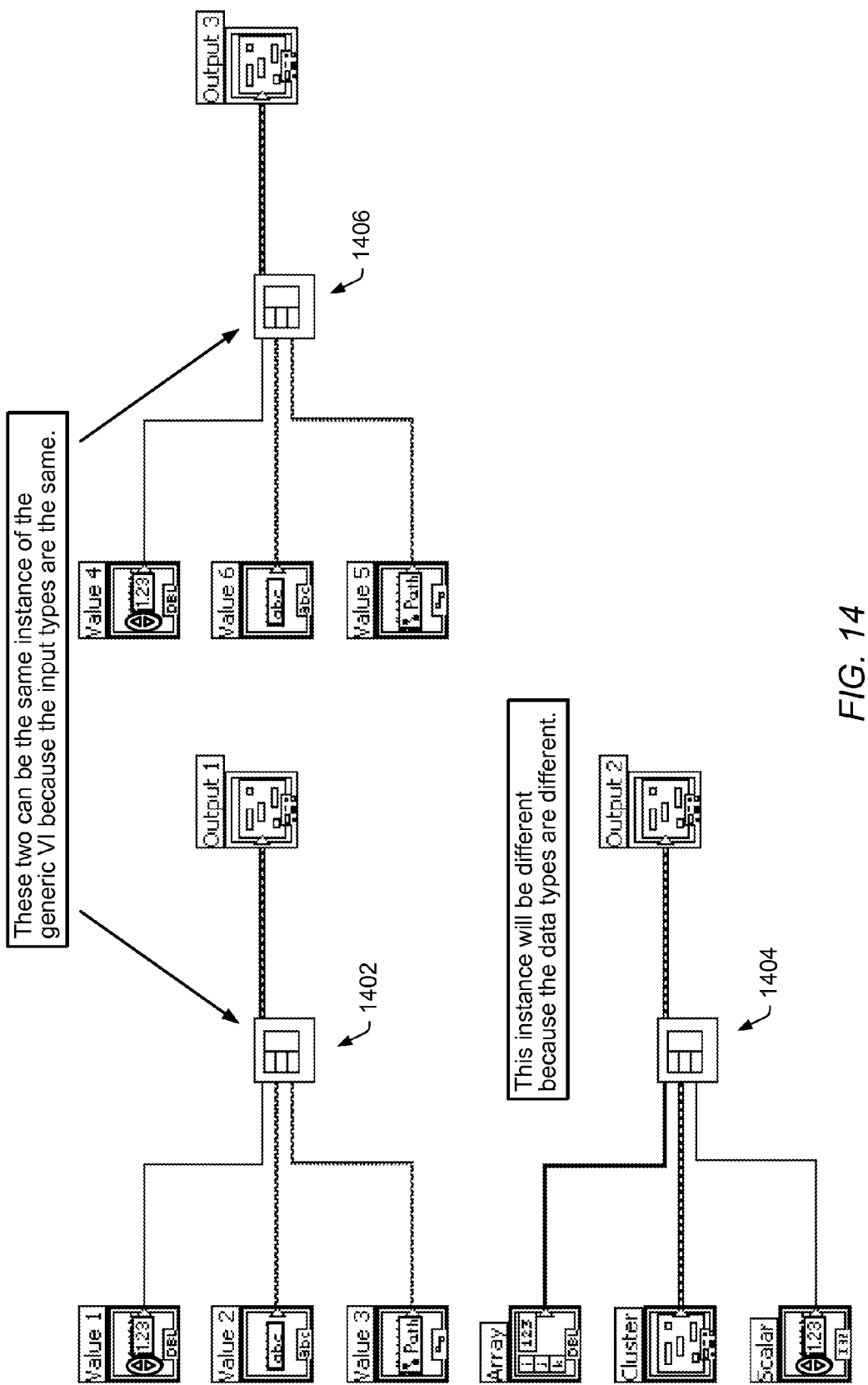
FIG. 14 is an exemplary graphical program corresponding to FIG. 8 which has been instantiated three times where two instantiations have common data types.

FIG. 14 illustrates an exemplary graphical program with three instantiations (1402, 1404, and 1406) of the type generic sub-VI. As shown, the data types for 1402 and 1406 are the same. Correspondingly, these two instantiations are identical and do not have to be duplicated. In other words, in one embodiment, 1402 and 1406 may refer to a single instantiation stored in memory. However, 1404 may be stored as an independent instantiation (e.g., with respect to 1402 and 1406). Thus, FIG. 14 illustrates an exemplary graphical program with three instantiations of a type generic version of the graphical program 900.

Figure 15:
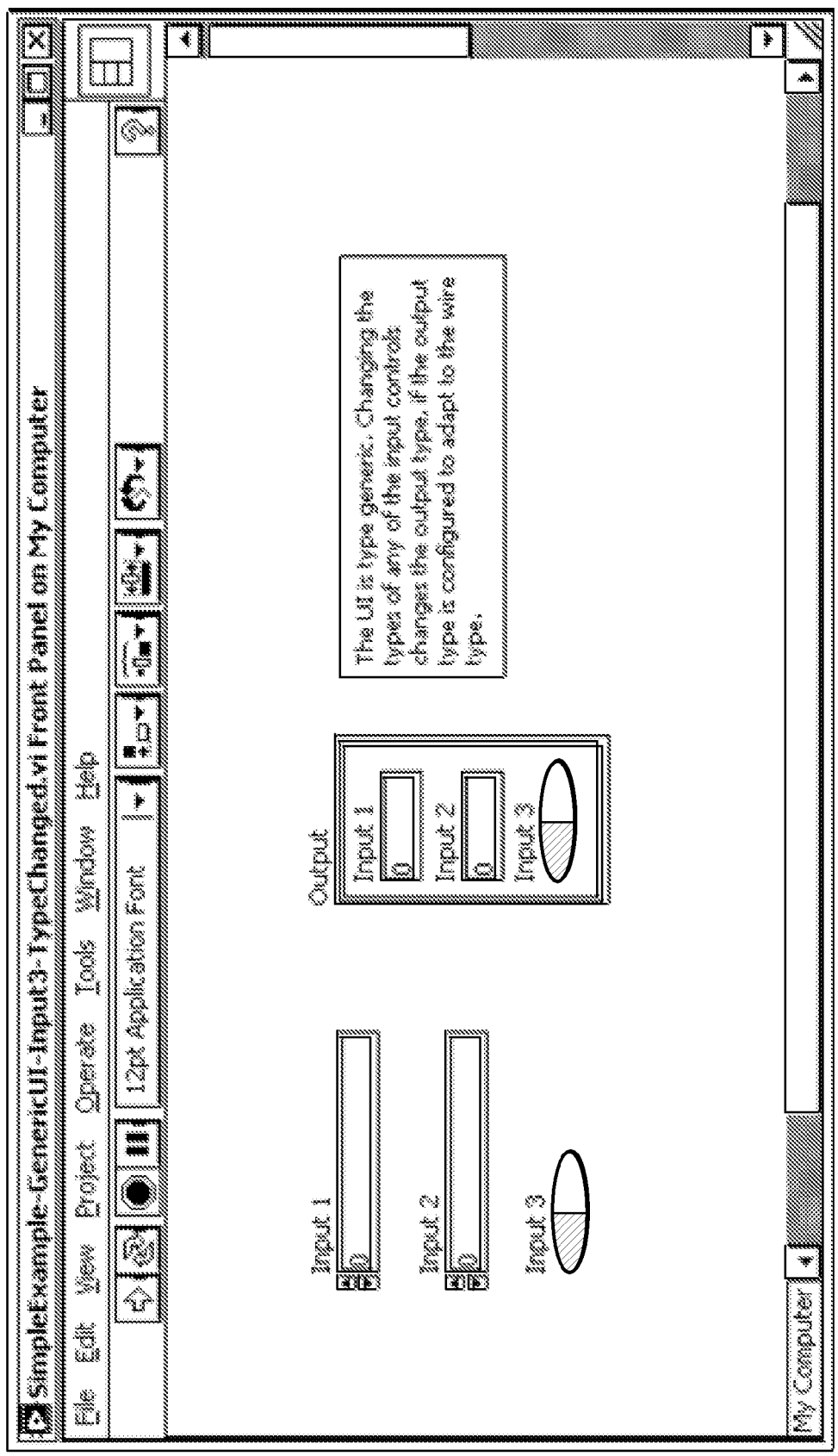
FIG. 15 illustrates the exemplary type generic front panel of the converted type generic version graphical program in FIG. 9 where input 3 has been assigned a different data type.

FIG. 15 illustrates the exemplary type generic front panel of the converted type generic version graphical program 900 where input 3 has been specified as a Boolean data type, e.g., in response to user input to the GUI or to the graphical program, using methods such as those described above, among others. As shown, the third input now illustrates a binary button for true and false and the output indicator has adapted to the wire connected to it and the third element of the output cluster is now a binary button.

Figure 16:
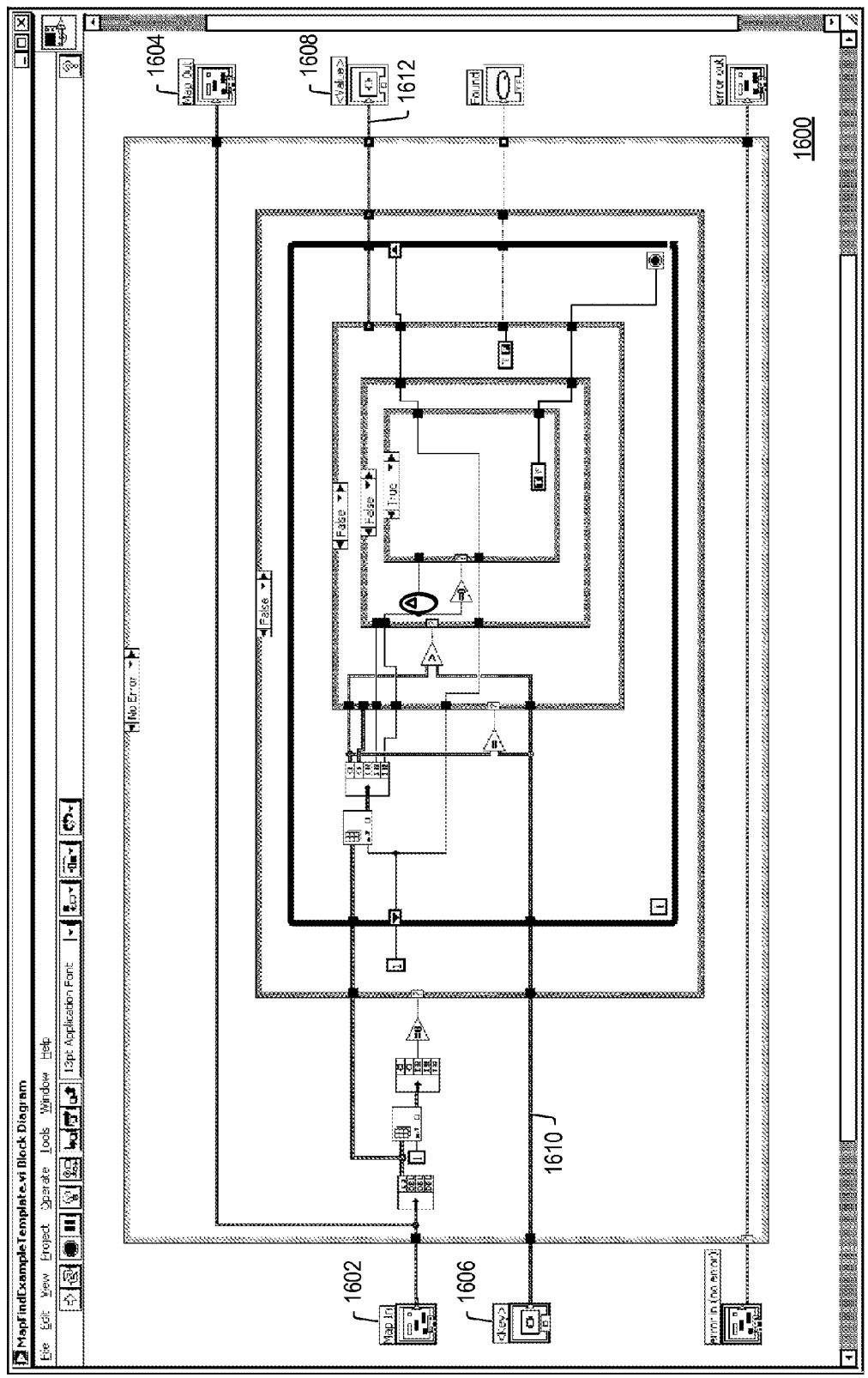
FIG. 16 illustrates an exemplary type generic graphical program for a mapping function according to one embodiment.

FIG. 16 illustrates an exemplary type generic graphical program 1600 for mapping keys and values. More specifically, the graphical program illustrates the implementation of a find algorithm that finds a value in the map corresponding to a provided key. The Map<Key, Value> is a sorted associative container that associates objects of type "key" with object of type "value". Additionally, in this example, no two elements have the same key (i.e., it is a unique associative container).

As shown in FIG. 16, the type generic graphical program may receive a map via Map In 1602 and a key via <Key> 1606 and may provide a map via Map Out 1604 and a <Value> via 1608. Additionally, wires 1610 and 1612 represent type generic wires (of type generic data types) for carrying the key and value respectively. The map (received via 1602 and provided via 1604) is implemented as a cluster with elements representing a tree. The elements include an array of clusters that represents the elements in the map: key, value, LChild (left node), RChild (right node), and Parent (parent node of the current node in the tree). The elements further include size (total number of elements in the array), count (actual number of elements used in the array), and index (the index of the root of the tree that represents the map).

Note that 1606 includes "<Key>" which indicates a type variable. Any other elements using <Key> typed variables (in this case, inside of 1602 and 1604) must have the same type as 1606. Similarly, "<Value>" in 1608 is of the same type used for <Value> inside 1602 and 1604. Said another way, the <Key> and <Value> elements of the array may be the type variables which shows the correspondence between the types that make up the map and the input and output types to the graphical program in 1600. In other words, every data type that is marked with the type variable <Key> has to have the same data type as another data type marked with the type variable <Key>. Similarly, every data type that is marked with the type variable <Value> has to have the same data type as another data type marked with the type variable <Value>.

Figure 17:
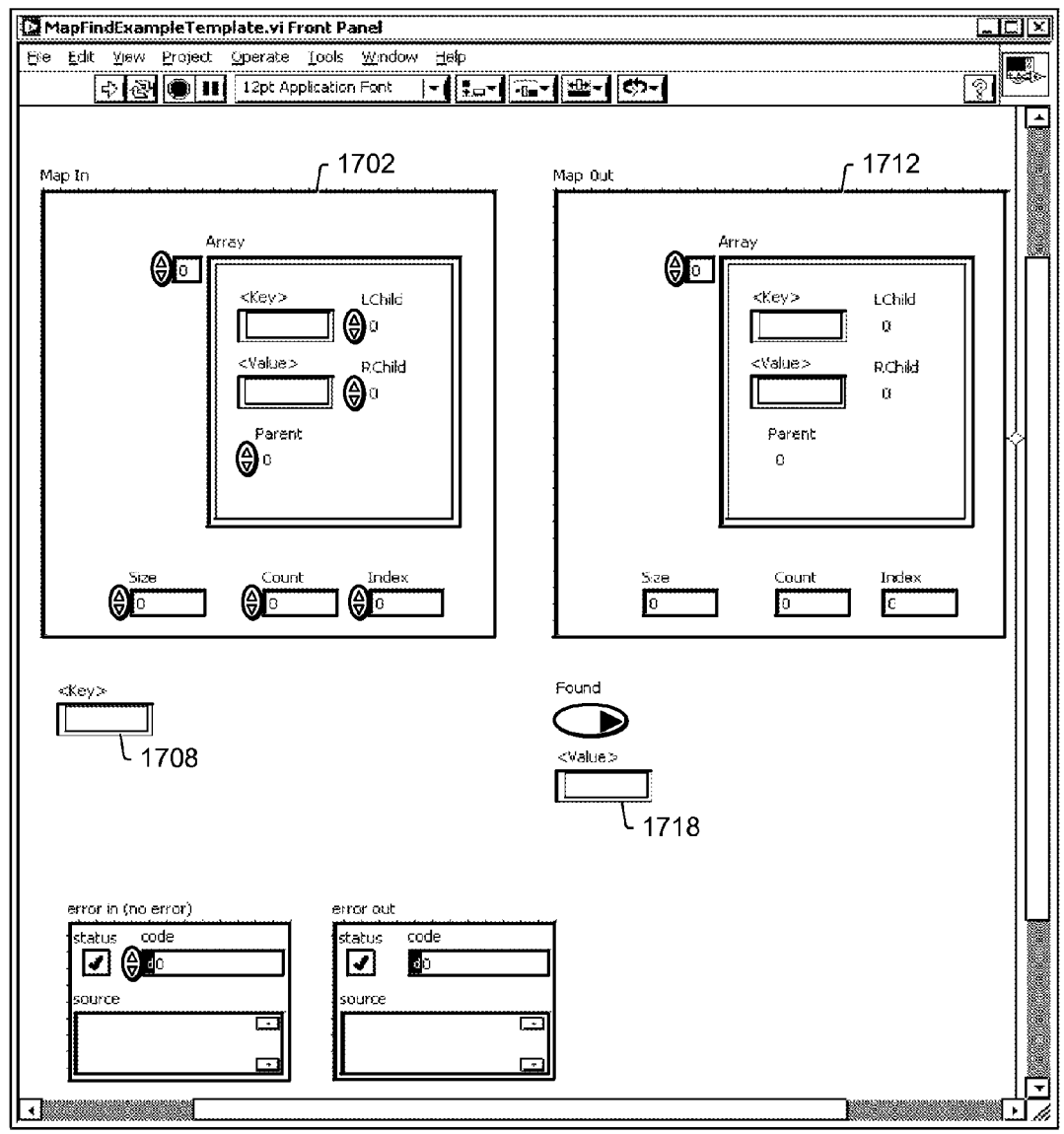
FIG. 17 illustrates an exemplary front panel for the graphical program of FIG. 15.

FIG. 17 illustrates an exemplary type generic front panel for the type generic graphical program 1600. As shown, Map In 1702 (corresponding to 1602) includes an array with elements of type <Key> (1704), <Value> (1706), Parent, LChild, and RChild. Additionally, Map Out 1712 (corresponding to 1604) similarly includes these elements (e.g., <Key> 1714 and <Value> 1716). Additionally, <Key> 1708 correspond to 1606 and <Value> 1718 correspond to 1608. Note that each of the inputs and outputs associated with <Key> and <Value> are shown with type generic inputs and outputs as the front panel shown is a type generic front panel.

Figure 18:
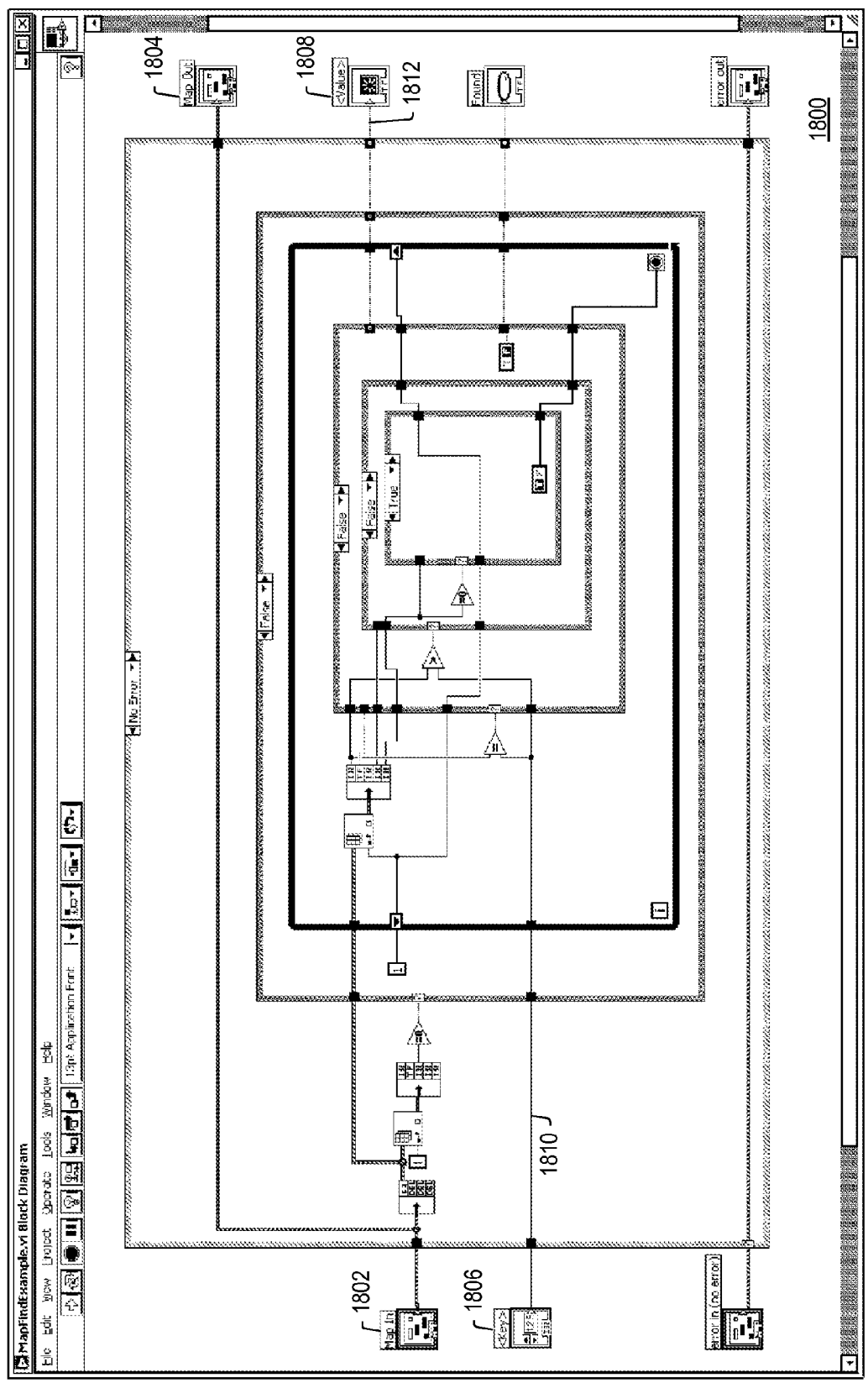
FIG. 18 illustrates an exemplary instantiated graphical program of the type generic graphical program of FIG. 16.

FIG. 18 illustrates a graphical program 1800 corresponding to the type generic graphical program 1600 that has had its type generic types associated with specific types. As shown in the graphical program 1800, an I32 data type has been associated with the <Key> input (shown by the change in appearance of 1806 and wire 1810), and a Boolean data type has been associated with the <Value> output (shown by the change in appearance of 1808 and wire 1812). Corresponding changes have occurred in 1802 and 1804 (not shown in this Figure).

The types of the graphical program 1800 may have been associated with the type generic graphical program 1600 using any of the methods described above, among others. For example, a user may associate the data type for Map In, such that the data type for <Key> is an I32 and the data type for <Value> is Boolean, then all the other data types named with the type variable <Key> in the VI change to I32 and all data types named with the type variable <Value> in the VI change to Boolean (e.g., automatically through type propagation). Since the <Key> and <Value> types are compatible with the graphical program, these types yield a valid graphical program.

Figure 19:
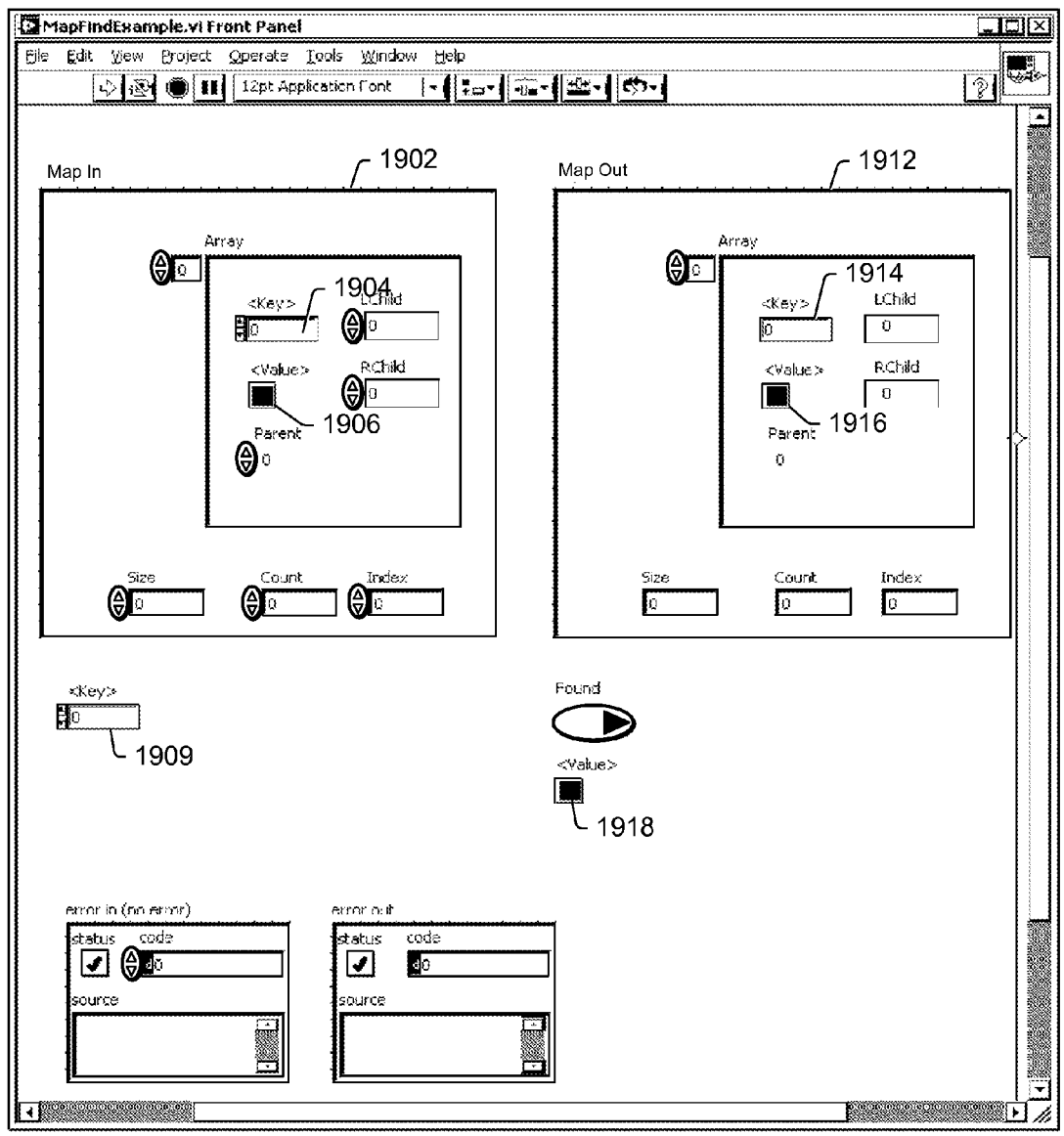
FIG. 19 illustrates an exemplary front panel for the instantiated graphical program of FIG. 18.

FIG. 19 illustrates an exemplary type generic front panel for the graphical program 1700. As shown, <Key> 1908, <Key> 1904 (from Map In 1902), and <Key> 1914 (from Map Out 1912) each have appearances/GUI element types corresponding to I32, and <Value> 1918, <Value> 1906, and <Value> 1916 each have appearance/GUI element types corresponding to Boolean.

Thus, FIGS. 16 and 17 illustrate an exemplary type generic graphical program with front panel that has been associated with specified types to instantiate a type specific graphical program as shown in FIGS. 18 and 19.

The use of type generic graphical program may provide many benefits over previous graphical programming methods. For example, the use of type generics in graphical programs allows a user to create a VI that may perform a useful function only once and then use that VI in many different situations with many different data types without having to manually re-specify the VI in the different data types. Additionally, instead of using costly larger data types, the user may specify the VI type generically, and then implement the VI using the most efficient data types. For example, a user may have previously written a floating point VI and used this VI every time any number needed to be manipulated in the way specified by the VI. Invariably, the user could have used a more efficient data type, such as a smaller length integer, but may not have done so due to the considerable effort involved in specifying a new VI for each use case.

Using type generics, the user can simply program the VI once and implement the VI as many times as needed using the desired data types for each case. As indicated above, this may be especially helpful when the graphical programs are implemented on programmable hardware elements as there are strict size and configuration time restraints on these devices. For example, using type generic graphical programs, creating code for each particular bit-width of the graphical program may be especially easy as the functionality of the type generic graphical program may apply to any bit-width, thus reducing user programming time. Thus, using type generic graphical programming, the user may create graphical programs with more ease and with more efficiency (both in user creation and graphical program execution) than using previous methods.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
    using a computer to implement:
        creating a first graphical program in response to user input, wherein the first graphical program includes a plurality of interconnected nodes, wherein the interconnected nodes visually indicate functionality of the first graphical program, wherein the first graphical program is type generic;
        wherein each of the nodes comprises at least one of an input or an output, and wherein for at least a first subset of the nodes, input(s) and/or output(s) for the first subset are not restricted to a specific data type;
        wherein the first graphical program is executable to perform the functionality for a plurality of different types;
        wherein the first graphical program comprises one set of graphical code that performs the functionality for the plurality of different types;
    instantiating a plurality of instances of the first graphical program in a second graphical program, wherein each instance is a type-specific graphical program;
        determining if two or more of the instances have same data types;
        if two or more of the instances have the same data types, replacing one or more of the instances with a reference to a particular instance of the first graphical program with the same data types.

2. The method of claim 1, wherein the plurality of nodes comprise at least one type generic input or output and at least one statically typed input or output.

3. The method of claim 1, wherein each of the one or more inputs and the one or more outputs of the plurality of nodes is type generic.

4. The method of claim 1,
    wherein nodes in at least a subset of the plurality of instances are associated with respective different data types.

5. The method of claim 1, wherein said determining is performed when type propagation occurs.

6. The method of claim 1, further comprising:
    receiving user input assigning data types for one or more inputs and/or one or more outputs of one or more of the plurality of nodes in the first graphical program; and
    automatically assigning types for a plurality of inputs and/or outputs of other nodes in the first graphical program, wherein said automatically assigning is performed in response to said receiving user input assigning data types.

7. The method of claim 1, wherein the first graphical program includes a type generic graphical user interface (GUI).

8. The method of claim 1, further comprising:
    instantiating the first graphical program in the second graphical program a plurality of times to produce a plurality of instances of the first graphical program;
    specifying data types for at least one element of each of the instances, wherein after said specifying, each of the instances is configured for the specified data types; and
    generating a hardware description of the second graphical program comprising the instances; and
    configuring a programmable hardware element with the hardware description to produce a configured programmable hardware element, wherein the configured programmable hardware element is operable to perform functionality of the second graphical program.

9. The method of claim 1, further comprising:
    analyzing attributes of one or more inputs and/or outputs of the plurality of nodes in the first graphical program;
    modifying at least a subset of the first graphical program to optimize performance of the at least a subset, wherein said modifying is performed based on said analyzing.

10. The method of claim 9, wherein the attributes comprise constant information which indicates that a node output is a constant, and wherein said modifying utilizes the constant information.

11. The method of claim 1, wherein said creating the first graphical program comprises:
creating a type specific graphical program; and
converting the type specific graphical program to the first graphical program.

12. The method of claim 1, further comprising:
specifying one or more data types for one or more inputs and/or one or more outputs of one or more of the plurality of nodes in the first graphical program;
automatically determining an implementation of the first graphical program based on the specified one or more data types.

13. The method of claim 12, wherein the first graphical program comprises a plurality of graphical subprograms, wherein at least one of the plurality of graphical subprograms is a type generic graphical subprogram; and
wherein said automatically determining an implementation of the first graphical program comprises selecting one of the plurality of graphical subprograms.

14. The method of claim 12, wherein the first graphical program comprises type checking logic, and wherein said automatically determining an implementation of the first graphical program comprises using the type checking logic.

15. The method of claim 1, wherein the first graphical program comprises one or more overloaded function nodes.

16. The method of claim 1, wherein the first graphical program is visually represented as a first node in the second graphical program, and wherein the method further comprises:
connecting one or more nodes in the second graphical program to the first node representing the graphical program in the other graphical program, wherein the one or more nodes in the second graphical program connected to the first node have associated types; and
propagating the associated types to one or more inputs and/or one or more outputs of one or more of the plurality of nodes in the first graphical program.

17. A non-transitory computer readable memory medium which stores:
a first graphical program, wherein the first graphical program includes a plurality of interconnected nodes, wherein the interconnected nodes visually indicate functionality of the first graphical program, wherein the first graphical program is type generic;
wherein each of the nodes comprises at least one of an input or an output, and wherein for at least a first subset of the nodes, input(s) and/or output(s) for the first subset are not restricted to a specific data type;
wherein the first graphical program is executable to perform the functionality for a plurality of different types;
wherein the first graphical program comprises one set of graphical code that performs the functionality for the plurality of different types;
instantiate a plurality of instances of the first graphical program in a second graphical program, wherein each instance is a type-specific graphical program;
determine if two or more of the instances have same data types;
if two or more of the instances have the same data types, replace one or more of the instances with a reference to a particular instance of the first graphical program with the same data types.

18. The non-transitory computer readable memory medium of claim 17, wherein the plurality of nodes comprise at least one type generic input or output and at least one statically typed input or output.

19. The non-transitory computer readable memory medium of claim 17, wherein each of the one or more inputs and the one or more outputs of the plurality of nodes is type generic.

20. The non-transitory computer readable memory medium of claim 17, wherein the program instructions are further executable to: wherein each instance is a type-specific graphical program, wherein nodes in at least a subset of the plurality of instances are associated with respective different data types.

21. The non-transitory computer readable memory medium of claim 17, wherein said determining is performed when type propagation occurs.

22. The non-transitory computer readable memory medium of claim 17, wherein the program instructions are further executable to:
receive user input assigning data types for one or more inputs and/or one or more outputs of one or more of the plurality of nodes in the first graphical program; and
automatically assign types for a plurality of inputs and/or outputs of other nodes in the first graphical program, wherein said automatically assigning is performed in response to said receiving user input assigning data types.

23. The non-transitory computer readable memory medium of claim 17, wherein the first graphical program includes a type generic graphical user interface (GUI).

24. The non-transitory computer readable memory medium of claim 17, wherein the program instructions are further executable to:
instantiate the first graphical program in the second graphical program a plurality of times to produce a plurality of instances of the first graphical program;
specify data types for at least one element of each of the instances, wherein after said specifying, each of the instances is configured for the specified data types; and
generate a hardware description of the second graphical program comprising the instances; and
configure a programmable hardware element with the hardware description to produce a configured programmable hardware element, wherein the configured programmable hardware element is operable to perform functionality of the second graphical program.

25. The non-transitory computer readable memory medium of claim 17, wherein the program instructions are further executable to:
analyze attributes of one or more inputs and/or outputs of the plurality of nodes in the first graphical program;
modify at least a subset of the first graphical program to optimize performance of the at least a subset, wherein said modifying is performed based on said analyzing.

26. The non-transitory computer readable memory medium of claim 25, wherein the attributes comprise constant information which indicates that a node output is a constant, and wherein said modifying utilizes the constant information.

27. The non-transitory computer readable memory medium of claim 17, wherein said creating the first graphical program comprises:
creating a type specific graphical program; and
converting the type specific graphical program to the first graphical program.

28. The non-transitory computer readable memory medium of claim 17, wherein the program instructions are further executable to:
- specify one or more data types for one or more inputs and/or one or more outputs of one or more of the plurality of nodes in the first graphical program;
- automatically determine an implementation of the first graphical program based on the specified one or more data types.

29. The non-transitory computer readable memory medium of claim 17, wherein the first graphical program comprises a plurality of graphical subprograms, wherein at least one of the plurality of graphical subprograms is a type generic graphical subprogram; and
- wherein said automatically determining an implementation of the first graphical program comprises selecting one of the plurality of graphical subprograms.

30. The non-transitory computer readable memory medium of claim 17, wherein the first graphical program comprises type checking logic, and wherein said automatically determining an implementation of the first graphical program comprises using the type checking logic.

31. The non-transitory computer readable memory medium of claim 17, wherein the first graphical program comprises one or more overloaded function nodes.

32. The non-transitory computer readable memory medium of claim 17, wherein the first graphical program is visually represented as a first node in the second graphical program, and wherein the program instructions are further executable to:
- connect one or more nodes in the second graphical program to the first node representing the graphical program in the second graphical program, wherein the one or more nodes in the second graphical program connected to the first node have associated types; and
- propagate the associated types to one or more inputs and/or one or more outputs of one or more of the plurality of nodes in the first graphical program.

* * * * *